United States Patent [19]
Mallon et al.

[11] Patent Number: 6,013,708
[45] Date of Patent: *Jan. 11, 2000

[54] CATIONIC WATER-SOLUBLE POLYMER PRECIPITATION IN SALT SOLUTIONS

[75] Inventors: Joseph J. Mallon, Danbury; Raymond S. Farinato, Norwalk, both of Conn.; Louis Rosati, South Salem; John J. Freeman, Jr., Valhalla, both of N.Y.

[73] Assignee: Cytec Technology Corp., Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/726,155

[22] Filed: Oct. 3, 1996

[51] Int. Cl.⁷ ................................................ C08K 5/41
[52] U.S. Cl. .................... 524/156; 524/157; 524/159; 524/161; 524/315; 524/458; 524/723; 524/745; 524/748; 524/750; 524/773
[58] Field of Search .................... 524/723, 745, 524/750, 157, 159, 161, 458, 748, 773, 315, 156

[56] References Cited

U.S. PATENT DOCUMENTS

| | | | |
|---|---|---|---|
| 3,234,163 | 2/1966 | Schurz et al. | 260/29.6 |
| 3,336,270 | 8/1967 | Monagie | 260/79.3 |
| 3,578,587 | 5/1971 | Kemmer . | |
| 3,692,673 | 9/1972 | Hoke . | |
| 4,224,149 | 9/1980 | Balcerski et al. . | |
| 4,380,600 | 4/1983 | Hosoda et al. | 524/458 |
| 4,525,515 | 6/1985 | Peignier et al. . | |
| 4,549,967 | 10/1985 | Branning . | |
| 4,569,991 | 2/1986 | Fujino | 528/492 |
| 4,588,508 | 5/1986 | Allenson et al. | 210/708 |
| 4,711,727 | 12/1987 | Matthews et al. . | |
| 4,929,655 | 5/1990 | Takeda et al. | 524/458 |
| 4,956,092 | 9/1990 | Blum . | |
| 5,006,590 | 4/1991 | Takeda et al. | 524/458 |
| 5,130,358 | 7/1992 | Danner | 524/140 |
| 5,154,857 | 10/1992 | Durrieu et al. . | |
| 5,326,479 | 7/1994 | Sarkar et al. . | |
| 5,330,656 | 7/1994 | Hassick | 210/708 |
| 5,403,883 | 4/1995 | Messner et al. | 524/458 |
| 5,585,034 | 12/1996 | Lysy et al. . | |
| 5,597,858 | 1/1997 | Ramesh et al. | 524/458 |
| 5,614,602 | 3/1997 | Connors et al. . | |
| 5,665,268 | 9/1997 | DeGuertechin et al. | 510/214 |
| 5,696,194 | 12/1997 | Connors et al. . | |
| 5,707,533 | 1/1998 | Connors et al. | 210/734 |
| 5,720,964 | 2/1998 | Murray | 424/401 |
| 5,840,804 | 11/1998 | Carl et al. | 524/555 |

FOREIGN PATENT DOCUMENTS

| | | |
|---|---|---|
| 0 183 466 B1 | 6/1986 | European Pat. Off. . |
| 0514649A1 | 11/1992 | European Pat. Off. . |
| 0525751A1 | 2/1993 | European Pat. Off. . |
| 0630909A1 | 12/1994 | European Pat. Off. . |
| 0657478A2 | 6/1995 | European Pat. Off. . |
| 0637 598 A2 | 8/1995 | European Pat. Off. . |
| 0 717 056 | 6/1996 | European Pat. Off. . |
| 0770 581 A1 | 2/1997 | European Pat. Off. . |
| 1 498 136 | 1/1978 | United Kingdom . |

OTHER PUBLICATIONS

Macromolecules, vol. 5, No. 1, Jan.–Feb. 1972, "Solution Properties of Novel Polyelectrolytes," D. Casson and A. Rembaum, pp. 75–81.

Journal of Polymer Science: Part B: Polymer Physics, vol. 32, 171–177 (1994), Association of Hydrophobic Counterions in Aqueous Solution of Poly (allylammonium) cloride: Comparison Between p–n–Propylbenzenesulfonate and p–iso–Propylbenzenesulfonate Ions, Tomoyuki Itaya, et al., pp. 171–177.

Macromolecules 1993, 26, "Stacking Interaction of Naphthalenesulfonate Ions around Poly (allylammonium) Cation," Itaya, et al, pp. 6021–6026.

Macromolecules 1991, 24, "Effects of Hydrophobic Hydration on Counterion Binding of Polycations," Satoh, et al, pp. 1123–1127.

Journal of Applied Polymer Science, vol. 52, 1994, Aqueous Solution Properties of Poly (Trimethyl Acrylamido Propyl Ammonium Iodide) [Poly(TMAAI)], pp. 1147–1458.

Journal of Polymer Science; Part A–1, vol. 7, (1969), Salt Effect On Polymer Solutions, Saito, pp. 1789–1802.

Polymer Bulletin 16 (1986), "Influence of denaturing agents on macromolecular coil dimensions of polyacrylamides in diluted aqueous solutions," Leca, pp. 537–543.

*Primary Examiner*—Judy M. Reddick
*Attorney, Agent, or Firm*—Joseph J. Mallon; Claire M. Schultz

[57] ABSTRACT

Compositions of precipitated cationic polymers containing mixtures of certain salts as well as processes for making and using the same are disclosed.

24 Claims, 9 Drawing Sheets

CATIONIC WATER-SOLUBLE POLYMER PRECIPITATION IN SALT SOLUTIONS

FIELD OF THE INVENTION

This invention relates generally to aqueous compositions of certain salts which contain precipitated, cationic, water-soluble polymers, methods for precipitating cationic, water-soluble polymers in aqueous solutions containing certain salts, methods for polymerizing monomers in aqueous solutions containing certain salts to form precipitated cationic, water-soluble polymers, optionally precipitated as polymer dispersions, and methods for using compositions of precipitated, cationic, water-soluble polymers in aqueous solutions of certain salts for various applications e.g. flocculation of suspended solids and soil conditioning.

BACKGROUND OF THE INVENTION

High molecular weight, water-soluble, cationic polymers are useful in a number of applications e.g. the flocculation of suspended solids, recovery of minerals from mining operations, papermaking, enhanced oil recovery, soil conditioning, etc. In many cases, the polymers are supplied to the user in the form of substantially dry polymer granules. The granules may be manufactured by the polymerization of water-soluble monomers in water to form a water-soluble polymer solution, followed by dehydration and grinding to form water-soluble polymer granules.

Another means for isolating the polymer from the polymer solution is to precipitate the polymer by mixing the polymer solution with an organic solvent e.g acetone or methanol that is a non-solvent for the polymer, then isolating the polymer by evaporation or filtration. However, in many cases, this method is inconvenient, expensive and dangerous because of the problem of handling large amounts of flammable organic solvent.

There have been a few reports of unusual precipitation behavior concerning particular cationic polymers. Certain novel cationic polyelectrolytes, termed ionene polymers, were reported (D. Casson and A. Rembaum, Macromolecules, Vol. 5, No. 1, 1972, pp. 75–81) to be insoluble in either 0.4 M potassium iodide or 0.4 M potassium thiocyanate. Poly(allylammonium chloride) was reported (T. Itaya et al., J. Polym. Sci., Pt. B: Polym. Phys., Vol. 32, pp. 171–177, 1994, and references 3, 5 and 6 therein, also Macromolecules, Vol 26, pp. 6021–6026, 1993) to precipitate in solutions containing the sodium salt of p-ethylbenzenesulfonate, or p-propylbenzenesulfonate or naphthalenesulfonate. Poly(4-vinyl pyridine) quaternized with butyl chloride and poly(allylammonium chloride) were reported (M. Saton, E. Yoda, and J. Komiyama, Macromolecules, Vol. 24, pp. 1123–27, 1991) to precipitate in solutions of NaI and also in solutions containing the sodium salt of p-ethylbenzenesulfonate, respectively. It has also been reported (W-F. Lee and C-C. Tsai, J. Appl. Polym. Sci., Vol. 52, pp. 1447–1458,1994) that poly(trimethyl acrylamido propyl ammonium iodide) did not dissolve in 0.5 M $Na_2ClO_4$ or 0.5 M $NaNO_3$.

Water-soluble polymers may also be supplied in the form of a water-in-oil emulsion or microemulsion, wherein the polymer solution droplets are isolated from each other by the continuous phase e.g. oil, of the emulsion or microemulsion. The polymer emulsions may be utilized directly in the desired application. Although this mode of supply is convenient and may avoid the need for dehydration, the oil may be expensive and is often flammable; in addition, the oil may also present a secondary pollution problem. Alternatively, the emulsion may be precipitated into an organic liquid that is a solvent for the water and oil, but a non-solvent for the polymer, followed by isolation and drying to recover the substantially dry polymer. However, these precipitation methods may be disadvantageous for the same reasons mentioned above.

A first water-soluble polymer may also be dispersed in the presence of a second water-soluble polymer to form aqueous polymer dispersions, as taught in U.S. Pat. Nos. 4,380,600 and 5,403,883. Since the two polymers do not dissolve each other, the first water-soluble polymer reportedly forms small globules which disperse in the solution of the second water-soluble polymer. Optionally, salt may be added to improve the flowability.

The polymers may also be precipitated in an aqueous salt solution. For instance, U.S. Pat. No. 3,336,270 discloses processes of polymerizing monomers to form water soluble polymers in aqueous solutions containing salt and tertiary butanol, wherein the polymer precipitates as it forms. U.S. Pat. Nos. 4,929,655 and 5,006,590; as well as EP 0 183 466 B1 and EP 0 630 909 A1, describe the polymerization of cationic water-soluble polymers in an aqueous solution which contains a multivalent anionic salt and a polymer dispersant, without the requirement of tertiary butanol. The aqueous solution of the multivalent anionic salt is a non-solvent for the polymer, so that the polymer precipitates as it forms. The polymer dispersant operates within the precipitation system by stabilizing the particles, but has no effect of depositing the polymer. The precipitation of the polymer depends on the functional group of the polymer and on the amount and identity of the salt. Polymer structural units which contain benzyl groups are more easily precipitated in salt solution than (meth)acrylamide structural units, which are themselves more easily precipitated than structural units such as (methacryloyloxyethyltrimethylammonium chloride), herein below DMAEM.MeCl, which do not contain benzyl groups. Typical cationic water-soluble polymers e.g. poly (methacryloyloxyethyltrimethylammonium chloride), hereinbelow poly(DMAEM.MeCl, tend to be soluble at room temperature in aqueous solutions of multivalent anionic salts such as those used in U.S. Pat. Nos. 4,929,655 and 5,006, 590. As compared to the emulsions, the replacement of the oil try an aqueous salt solution was an advance in the art because the aqueous salt solution was not flammable and posed less of a secondary pollution problem. However, the presence of an aromatic benzyl group in the polymer may be a disadvantage from an economic and environmental perspective.

Polymers and monomers which contain hydrophobic groups e.g. benzyl may not themselves be hydrophobic because they may have a high degree of water solubility. However, polymers with hydrophobic groups tend to be more easily precipitated in salt solutions than polymers without hydrophobic groups. Although the benzyl group could be replaced by a hydrophobic alkyl group as in EP 0 525 751 A1, it would be clearly advantageous to eliminate the need for these hydrophobic groups entirely so as to avoid the expense and inconvenience of making the monomer which contains the hydrophobic group. Accordingly, there exists a need for compositions that may act as non-solvents for typical cationic water-soluble polymers presently used in applications such as water treating, mining, papermaking, oil recovery, etc., that are relatively non-flammable, inexpensive, and non-toxic.

The effect of salts on the solubility of various substances in aqueous solution is well discussed in the scientific literature. The "Hofmeister" series ranks anions according to their ability to increase or decrease the solubility of substances in water. Although positions in the ranking may vary slightly, depending on the substance, a generally accepted ranking of the anions is:

Salting-out (kosmotropic)

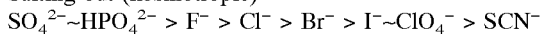
$SO_4^{2-} \sim HPO_4^{2-} > F^- > Cl^- > Br^- > I^- \sim ClO_4^- > SCN^-$ Salting-in (chaotropic)

It is well known that kosmotropic salts generally decrease the solubility of many substances in water. For instance, the Hofmeister ranking apparently guided the choice of salts for precipitating cationic water soluble polymers, containing hydrophobic groups, in U.S. Pat. Nos. 4, 929,655 and 5,006,590, as well as EP 0 630 909 A1, EP 0 525 751 A1, and EP 0 657 478 A2, as evidenced by their use of strongly kosmotropic salts containing sulfate and phosphate anions. On the other hand, chaotropic salts generally increase the solubility of substances in water.

There are numerous means known to those skilled in the art for determining whether a particular salt is kosmotropic or chaotropic. Representative salts which contain anions such as sulfate, fluoride, phosphate, acetate, citrate, tartrate and hydrogenphosphate are kosmotropic. Representative salts which contain anions such as thiocyanate, perchlorate, chlorate, bromate, iodide, nitrate and bromide are chaotropic. The chloride anion is generally considered to be at about the middle of the Hofmeister ranking, being neither strongly chaotropic nor strongly kosmotropic. For our purposes, inorganic salts which contain the chloride anion are neither chaotropic nor kosmotropic.

Small amounts of sodium thiocyanate, for instance about 0.1% by weight, on total, have been reported to be useful as stabilizers for polymer dispersions as in EP 0 657 478 A2, where $(NH_4)_2SO_4$ was used to deposit the polymer. Sodium thiocyanate and sodium iodide have been reported to be useful as stabilizers for hydroxylamine-containing water-soluble polymer systems, as in EP 0 514 649 A1. U.S. Pat. No. 3,234,163 teaches that small amounts of thiocyanate salts, preferably 0.1 to 1 percent, based on the weight of the polymer, are useful for stabilizing polyacrylamide solutions. The thiocyanate salts are claimed to stabilize the polyacrylamide by preventing or slowing molecular weight breakdown.

Many literature reports concerning the Hofmeister ranking of salts have included studies of their effects on low molecular weight substances which have relatively low water-solubility. However, the Hofmeister ranking has also Leen observed when the substrates were high molecular weight, water-soluble polymers. For instance, the effect of various salts on the solubility of synthetic, water-soluble polymers was explored by Shuji Saito, J. Polym. Sci.: Pt. A, Vol. 7, pp.1789–1802 (1969). This author discussed the effect of various anions on polymer solubility and stated "This anionic order seems to be independent of the type of counter cations and is in line with Hofmeister's lyotropic series for anions." Similarly, in M. Leca, Polymer Bulletin, Vol. 16, pp. 537–543, 1986, the viscosity of polyacrylamide, as determined in 1N solutions of various salts, was found to increase in the order $HPO_4^{2-} < H_2O < Br^- < NO_3^- < I^- = BrO_3^- < ClO_3 = SCN^-$. The viscosities were reported to be higher in more chaotropic salt solutions than in less chaotropic, or kosmotropic, salt solutions.

Certain anionic organic salts, such as hydrotropes and surfactants, also tend to increase the solubility of substances in water. The way that anionic organic salts act to increase the solubility of substances in water generally depends on the identity of the organic portion. Salts with smaller organic portions tend to function as hydrotropes, whereas salts with larger organic groups tend to function as surfactants.

The ability of surfactants to enhance the solubility of substances in water is well known. Compositions comprising sulphonated hydrocarbon surfactants and hydrophilic cationic polymers were disclosed in U.S. Pat. No. 5,130,358. For the purposes of this invention, surfactants are defined as surface active agents that have the ability to reduce the surface tension at an interface without requiring concentrations so large that the distinction between solute and solvent is blurred.

Surprisingly, and contrary to the teachings cited above, it has now been found that many typical water-soluble, cationic polymers such as poly(DMAEM.MeCl), which do not contain hydrophobic groups, can be precipitated in aqueous solution by the presence of a mixture of a chaotropic salt, or an anionic organic salt, and a kosmotropic salt. Therefore, in accordance with our invention, processes for precipitating water-soluble, cationic polymers by mixing water-soluble, cationic polymers with at least one chaotropic salt, or anionic organic salt, and at least one kosmotropic salt are provided. Compositions comprising water, at least one chaotropic salt, or anionic organic salt, at least one kosmotropic salt, and at least one precipitated cationic water-soluble polymer are also embodied in the instant invention. Compositions in which the precipitated polymer is dispersed in the form of small droplets so as to produce a polymer dispersion are preferred. These polymer dispersions may be stabilized by a dispersant, which may be a different water-soluble polymer, and the precipitated polymer is preferably formed by polymerization of monomers in the salt solution, optionally in the presence of said dispersant. Processes for using these compositions to concentrate dispersions of suspended solids and to condition soil are also disclosed.

SUMMARY OF THE INVENTION

The present invention is directed to compositions of precipitated cationic polymers in solutions of chaotropic salts, and/or anionic organic salts, and kosmotropic salts, as well as processes for making and using the same. The cationic polymers may contain a hydrophobic group, but it is not required, so that modification of the polymer structure in order to bring about precipitation in the salt solution, as taught in the prior art, is not necessary. Compositions in which the polymer is dispersed in the form of small droplets are preferred, and methods of making these polymer dispersions which may include dispersants, are taught herein. A particularly preferred method is to form the polymer dispersion by polymerization of the monomers in solutions of the salts, optionally in the presence of one or more different water-soluble polymers which act as dispersants. Methods of using the compositions of the instant invention for applications such as flocculation of suspended solids, solid-liquid separations, mining, papermaking, soil conditioning, etc. are also embodied herein.

Embodiments of the instant invention include compositions comprised of water, at least one precipitated cationic water-soluble polymer, an effective amount of at least one kosmotropic salt, and an effective amount of at least one chaotropic salt, wherein said chaotropic salt is present in an amount greater than 1%, by weight, based on the weight of said cationic water-soluble polymer; preferred compositions are comprised of water, at least one precipitated cationic water-soluble polymer, from 1% to 27% by weight, based on total weight, of a sulfate salt, and from 1% to 200% by weight, based on total polymer weight, of a thiocyanate salt, wherein said precipitated cationic water-soluble polymer is comprised of recurring units of a quaternary salt of a dialkylaminoalkyl(alk)acrylate. Compositions, optionally containing a second water-soluble polymer, in which the cationic water-soluble polymer is precipitated as a dispersion, are also preferred.

Further embodiments include processes comprising mixing, in any order, water, at least one cationic water-soluble polymer, an effective amount of at least one kosmotropic salt, and an effective amount of at least one chaotropic salt to form an aqueous composition comprising at least one precipitated cationic water-soluble polymer, wherein said chaotropic salt is present in an amount greater than 1%, by weight, based on the weight of said cationic water-soluble polymer; preferred embodiment include processed comprising mixing, in any order, a cationic water-soluble polymer comprised of recurring units of a quaternary salt of a dialkylaminoalkyl(alk)acrylate, from 1% to 200%, by weight based on total polymer weight, of a thiocyanate salt, and from 1% to 27%, by weight based on total weight, of a sulfate salt, to form an aqueous composition comprising at least one precipitated cationic water-soluble polymer. Processes which comprise mixing in a second water-soluble polymer are also preferred.

Processes comprising polymerizing at least one cationic monomer in an aqueous solution comprised of an effective amount of at least one chaotropic salt and an effective amount of at least one kosmotropic salt, to form an aqueous composition comprising at least one precipitated cationic water-soluble polymer, are also disclosed herein; preferred embodiments include processes comprising polymerizing monomers comprised of a quaternary salt of a dialkylaminoalkyl(alk)acrylate, in an aqueous solution comprised of (a) from 0.1% to 250%, by weight based on total monomer weight, of a thiocyanate salt and (b) from 1% to 28%, by weight based on total weight, of a sulfate salt, to form an aqueous composition comprising at least one precipitated cationic water-soluble polymer. Processes wherein said water-soluble cationic polymers are precipitated as a dispersion are preferred, optionally in the presence of a second water-soluble polymer.

Applications of the instant invention include processes of concentrating a dispersion of suspended solids which comprise dewatering a dispersion of suspended solids by adding to said dispersion an effective amount of an aqueous composition comprised of an effective amount of at least one chaotropic salt, an effective amount of at least one kosmotropic salt, and at least one precipitated cationic water-soluble polymer, and separating the resultant concentrated dispersion, wherein said chaotropic salt is present in an amount greater than 1%, by weight, based on the weight of said cationic water-soluble polymer; preferred embodiments include processes of concentrating a dispersion of suspended solids which comprises dewatering a biologically treated suspension by adding to said suspension an effective amount of a composition comprised of at least one precipitated cationic water-soluble polymer, from 1% to 27% by weight, based on total weight, of a sulfate salt, and from 1% to 200% by weight, based on total polymer weight, of a thiocyanate salt, and separating the resultant concentrated dispersion, where said precipitated cationic water-soluble polymer is comprised of recurring units of a quaternary salt of a dialkylaminoalkyl(alk)acrylate. Other applications include processes of conditioning soil which comprises adding to the soil a soil-conditioning amount of an aqueous composition comprised of an effective amount of at least one chaotropic salt, an effective amount of at least one kosmotropic salt, and at least one precipitated cationic water-soluble polymer. Processes in which said compositions are first dissolved in water before being added to said suspension or said soil are also preferred, as are processes wherein said water-soluble cationic polymers are precipitated as a dispersion, optionally in the presence of a second water-soluble polymer.

Surprisingly, it has also been found that mixtures of anionic organic salts and kosmotropic salts are useful for precipitating cationic water-soluble polymers. Embodiments of this invention include compositions comprised of water, at least one precipitated cationic water-soluble polymer, an effective amount of at least one kosmotropic salt, and an effective amount of at least one anionic organic salt; preferred embodiments include compositions comprised of water, at least one precipitated cationic water-soluble polymer, from 1% to 27% by weight, based on total weight, of a sulfate salt, and from 0.5% to 35% by weight, based on total weight, of a sulfonate salt, wherein said precipitated cationic water-soluble polymer is comprised of recurring units of a quaternary salt of a dialkylaminoalkyl(alk) acrylate. Compositions, optionally containing a second water-soluble polymer, in which the cationic water-soluble polymer is precipitated as a dispersion, are also preferred.

Other embodiments include processes comprising mixing, in any order, water, at least one cationic water-soluble polymer, an effective amount of at least one kosmotropic salt, and an effective amount of at least one anionic organic salt, to form an aqueous composition comprising at least one precipitated cationic water-soluble polymer; preferred embodiments include processes comprising mixing, in any order, a cationic water-soluble polymer comprised of recurring units of a quaternary salt of a dialkylaminoalkyl (alk)acrylate, from 0.5% to 35%, by weight based on total weight, of a sulfonate salt, and from 1% to 27%, by weight based on total weight, of a sulfate salt, to form an aqueous composition comprising at least one precipitated cationic water-soluble polymer. Processes which comprise mixing in a second water-soluble polymer are also preferred.

Further embodiments include processes comprising polymerizing at least one cationic monomer in an aqueous solution comprised of an effective amount of at least one anionic organic salt and an effective amount of at least one kosmotropic salt, to form an aqueous composition comprising at least one precipitated cationic water-soluble polymer; preferred embodiments include processes comprising polymerizing monomers comprised of a quaternary salt of a dialkylaminoalkyl(alk)acrylate, in an aqueous solution comprised of (a) from 0.5% to 40%, by weight based on total weight, of a sulfonate salt and (b) from 1% to 28%, by weight based on total weight, of a sulfate salt, to form an aqueous composition comprising at least one precipitated cationic water-soluble polymer. Processes wherein said water-soluble cationic polymers are precipitated as a dispersion are preferred, optionally in the presence of a second water-soluble polymer.

Applications of the instant invention include processes of concentrating a dispersion of suspended solids which comprises dewatering a dispersion of suspended solids by adding to said dispersion an effective amount of an aqueous composition comprised of an effective amount of at least one anionic organic salt, can effective amount of at least one kosmotropic salt, and at least one precipitated cationic water-soluble polymer, and separating the resultant concentrated dispersion; preferred embodiments include processes of concentrating a dispersion of suspended solids which comprises dewatering a biologically treated suspension by adding to said suspension an effective amount of a composition comprised of from 1% to 27% by weight, based on total weight, of a sulfate salt, and from 0.5% to 35% by weight, based on total weight, of a sulfonate salt, and at least one precipitated cationic water-soluble polymer, and separating the resultant concentrated dispersion, wherein said precipitated cationic water-soluble polymer is comprised of recurring units of a quaternary salt of a dialkylaminoalkyl (alk)acrylate. Other applications include processes of conditioning soil which comprises adding to the soil a soil-conditioning amount of an aqueous composition comprised of an effective amount of at least one anionic organic salt, an effective amount of at least one kosmotropic salt, and at least one precipitated cationic water-soluble polymer. Processes In which said compositions are first dissolved in water before being added to said suspension or said soil are also preferred, as are processes wherein said water-soluble cationic polymers are precipitated as a dispersion, optionally in the presence of a second water-soluble polymer.

BRIEF DESCRIPTION OF THE

The following abbreviations are used in the drawings and throughout the specification:

Poly(DMAEM.BzCl): Poly(methacryloxyethyldimethylbenzilammonium chloride)
Poly(DEAEM.MeCl): Poly(methacryloxyethyldiethylmethylammonium chloride)
Poly(AMBTAC): Poly(acrylamido(2-methylbutyl)trimethylarnmonium chloride)
Poly(DMAEM.MeCl): Poly(methacryloxyethyltrimethylammrionium chloride)
Poly(DMAEA.MeCl): Poly(acryloxyethyltrimethylammonium chloride)
Poly(MAPTAC): Poly(acrylamidopropyltrimethylammonium chloride)

The accompanying drawings are presented in conjunction with the Detailed Description below:

Figure 6A:
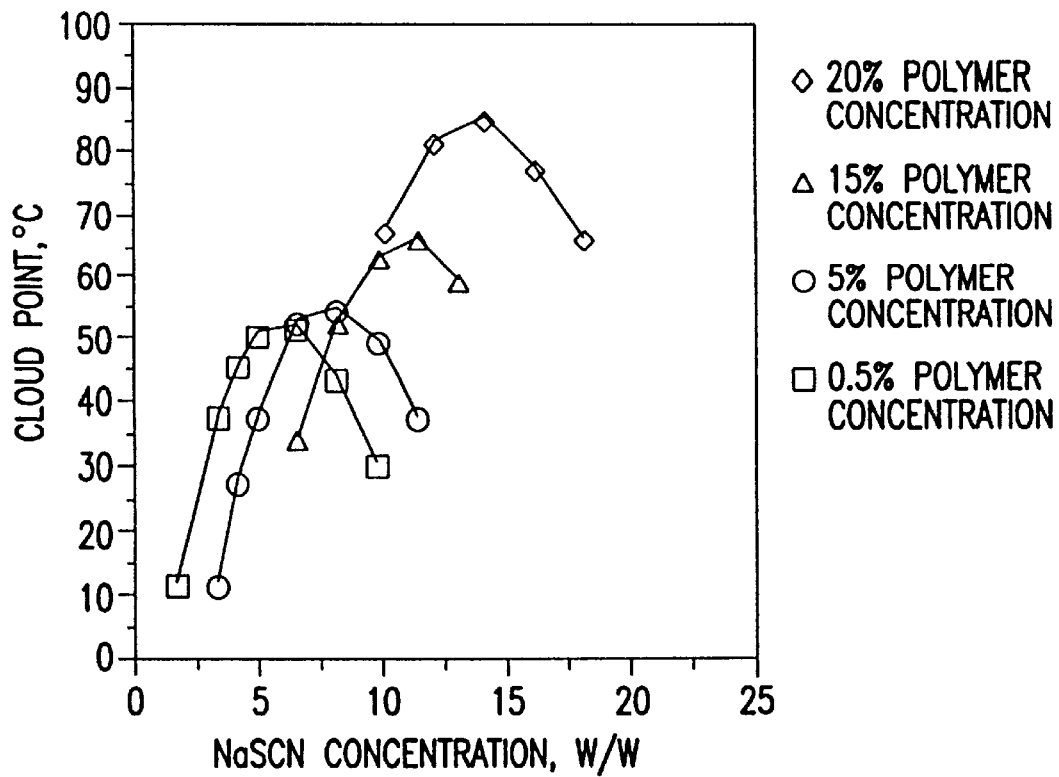
Figure 6B:
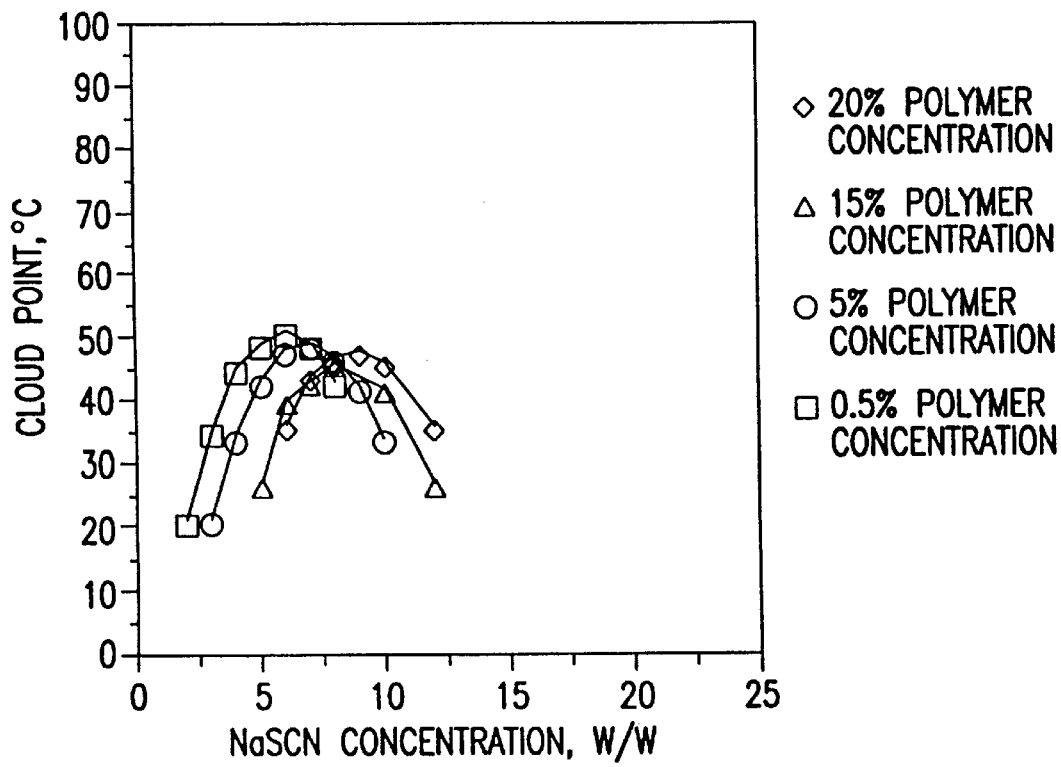

FIG. 6(a) and 6(b) are plots of the cloud points of poly(DMAEM.MeCl) and poly(DMAEM.DMS) (the polymer from the dimethyl sulfate quaternary salt of DMAEM) respectively, as a function of NaSCN concentration in 5 wt % $(NH_4)_2SO_4$.

Figure 7:
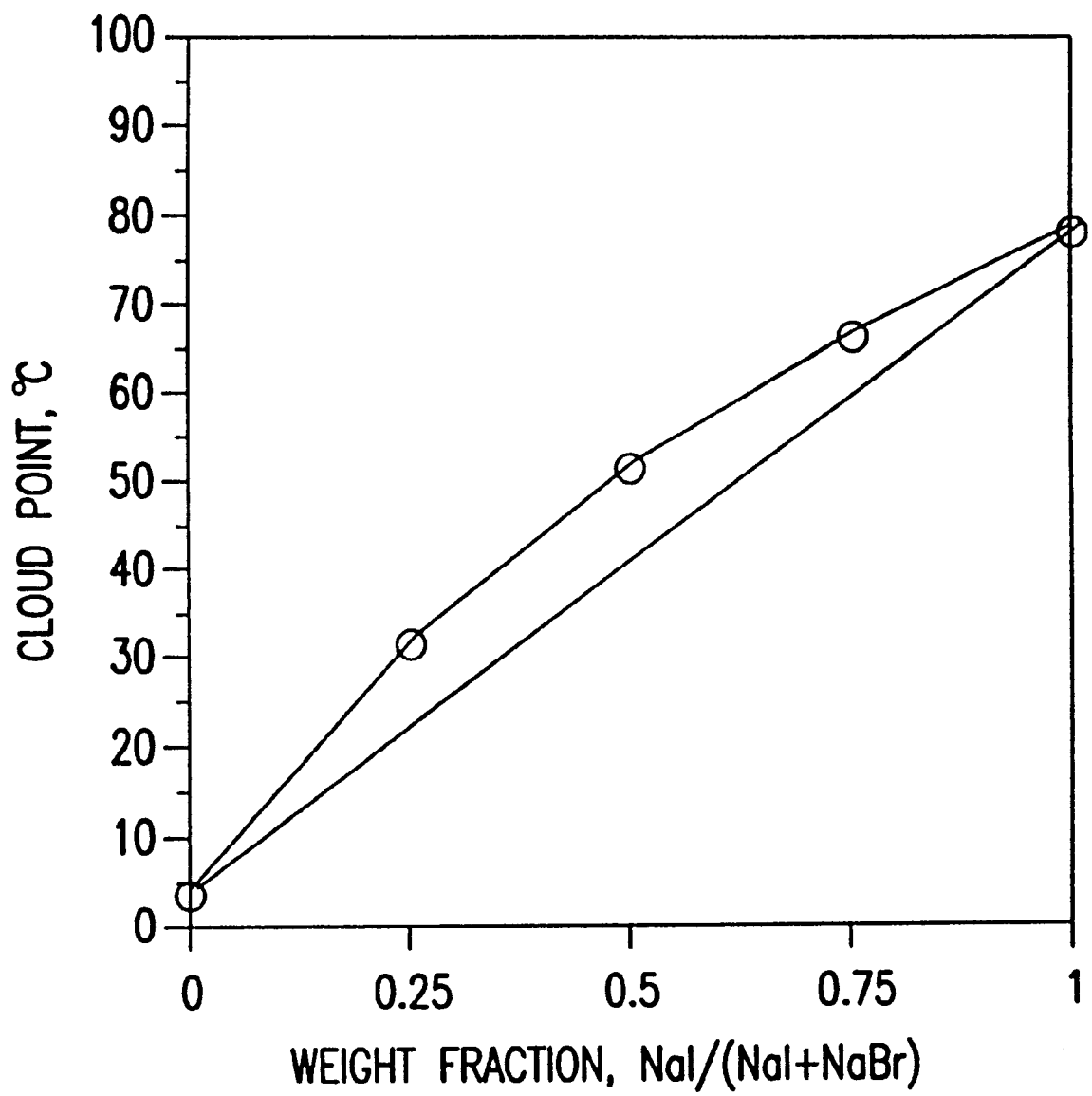

FIG. 7 is a plot of the cloud points of 0.5 wt % poly (DMAEM.MeCl) as a function of wt % NaI in a 4 wt % NaI/NaBr mixture in 20% $(NH_4)_2SO_4$. The straight line connecting the endpoints of the curved line is the behavior expected based on the "rule of mixtures."

Figure 8:
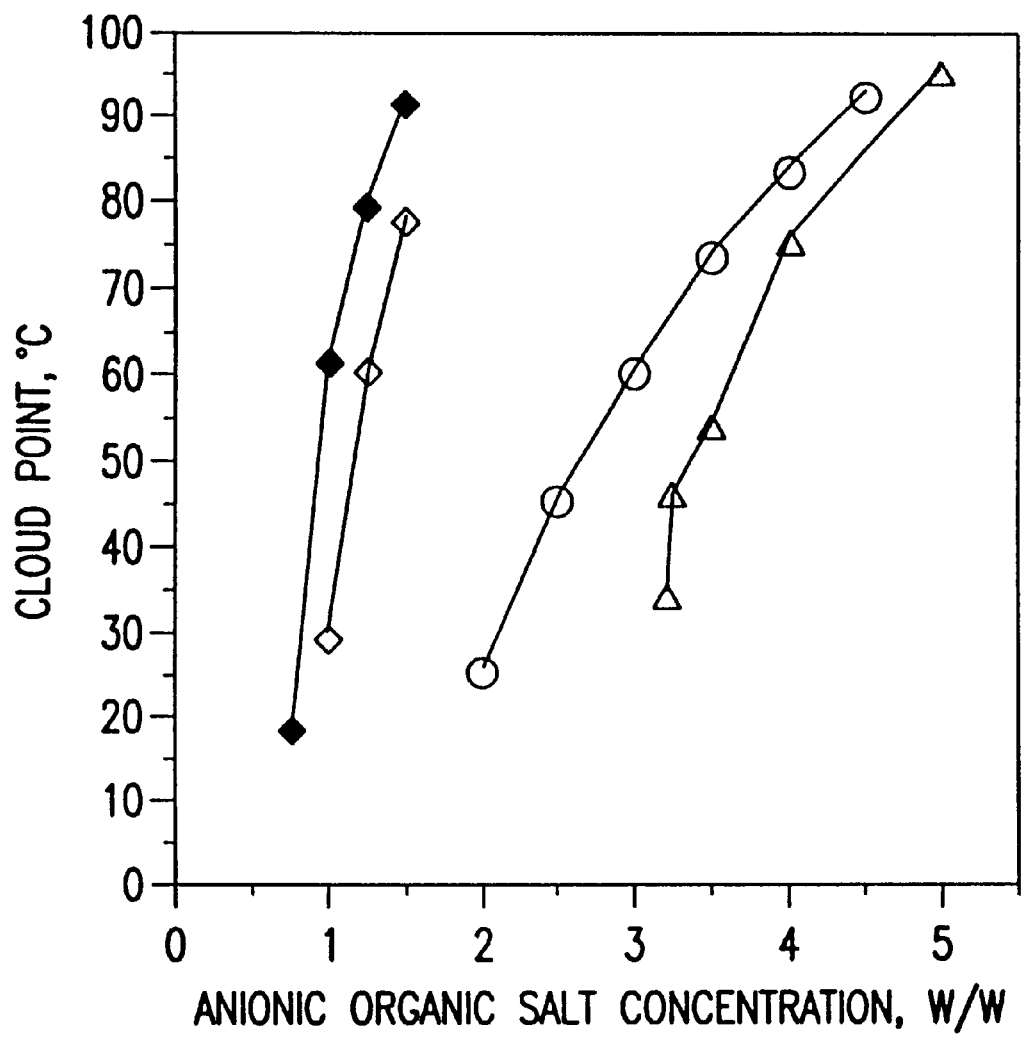

FIG. 8 is a plot of the cloud points of 0.5 wt % poly (DMAEM.MeCl) as a function of anionic organic salt concentration in the absence of $(NH_4)_2SO_4$. (Comparative).

Figure 9:
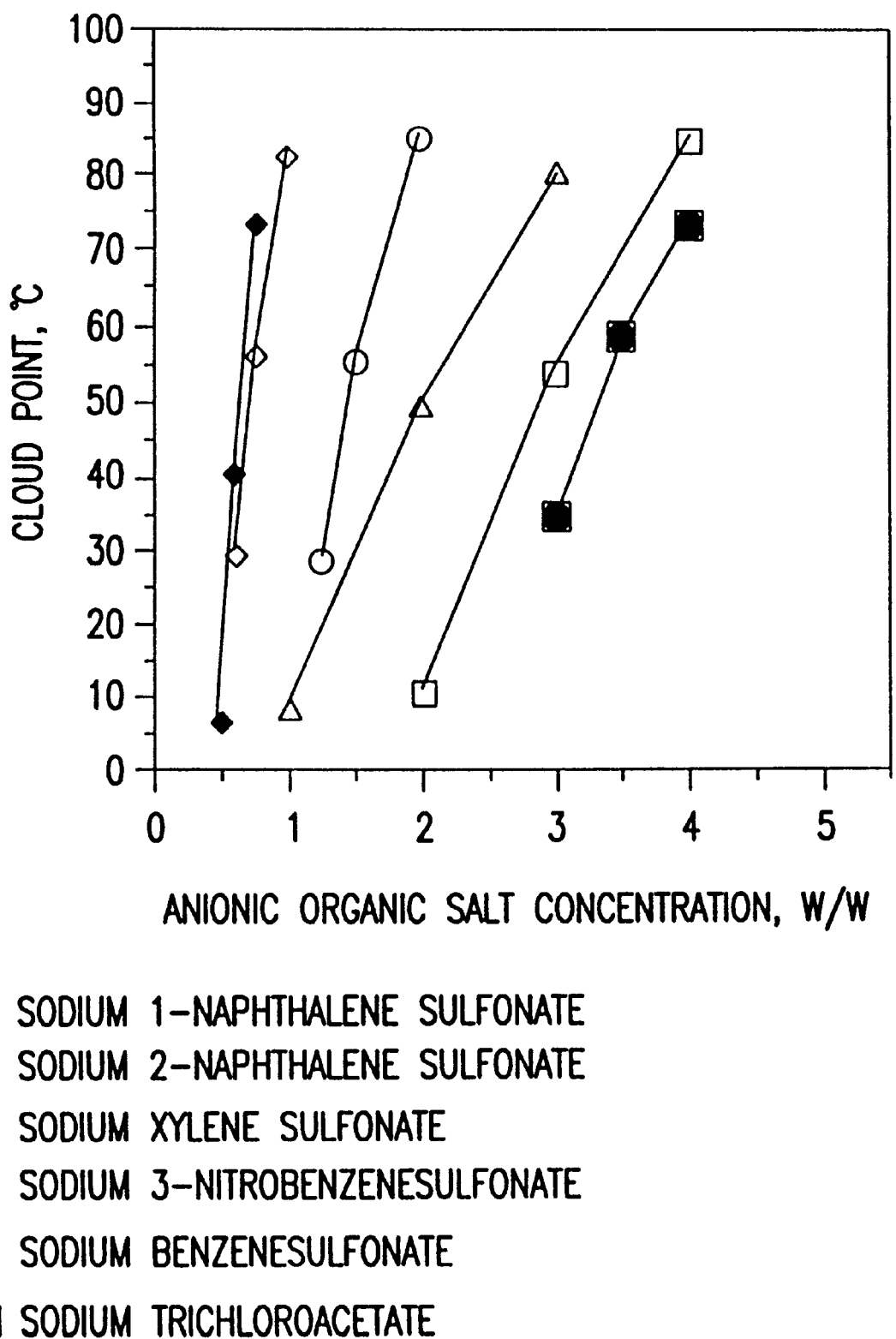

FIG. 9 is a plot of the cloud points of 0.5 wt % poly (DMAEM.MeCl) as a function of anionic organic salt concentration in 20 wt % $(NH_4)_2SO_4$.

Figure 10:
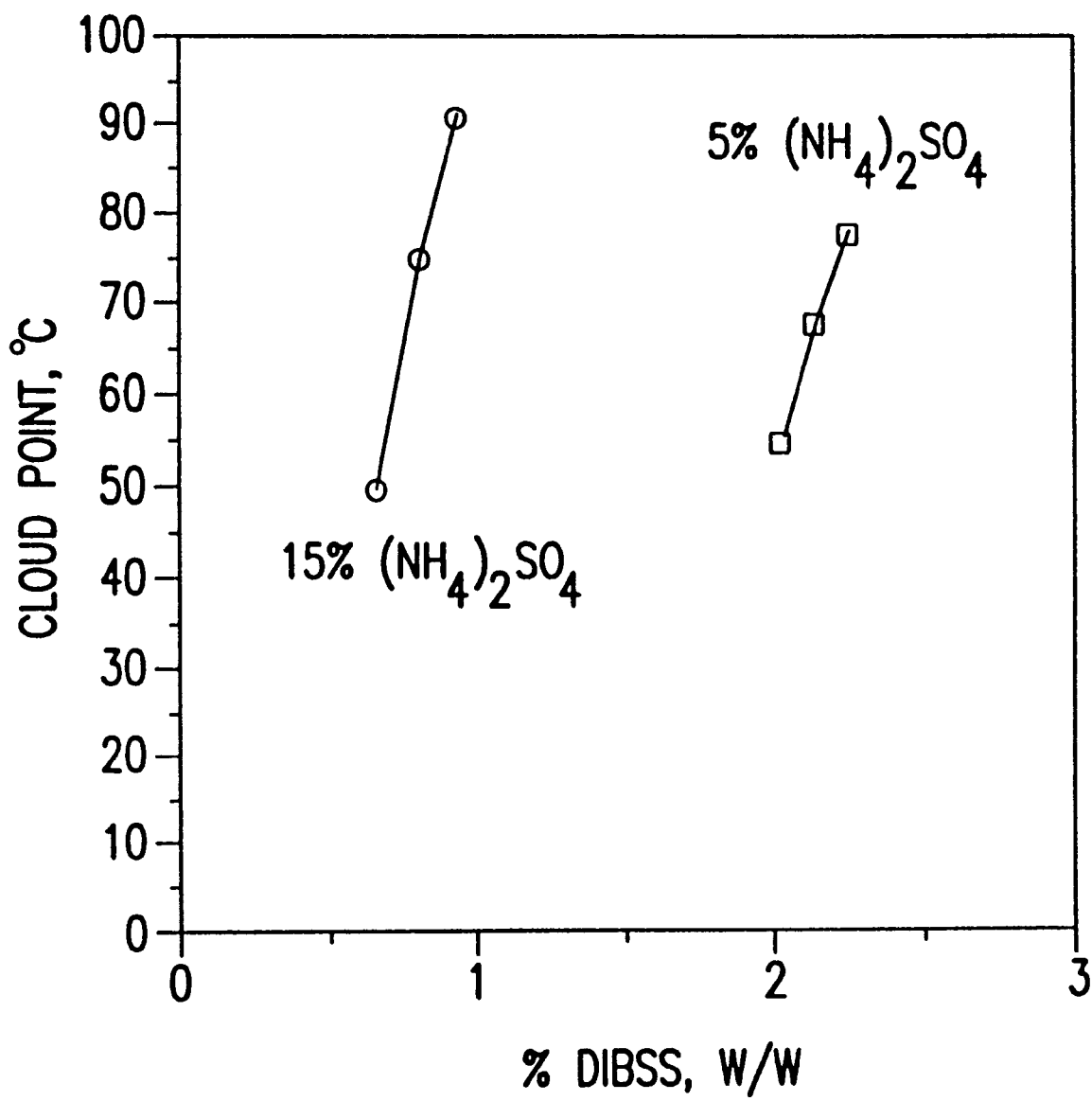

FIG. 10 is a plot of the cloud points of 0.5 wt % poly(45-AMD/55-DMAEM.MeCl) (a copolymer having 45 mole % acrylamide and 55 mole % DMAEM.MeCl) as a function of wt % DIBSS (sodium diisobutylsulfosuccinate) at 5 wt % $(NH_4)_2SO_4$ and 15 wt % $(NH_4)_2SO4$.

Figure 11:
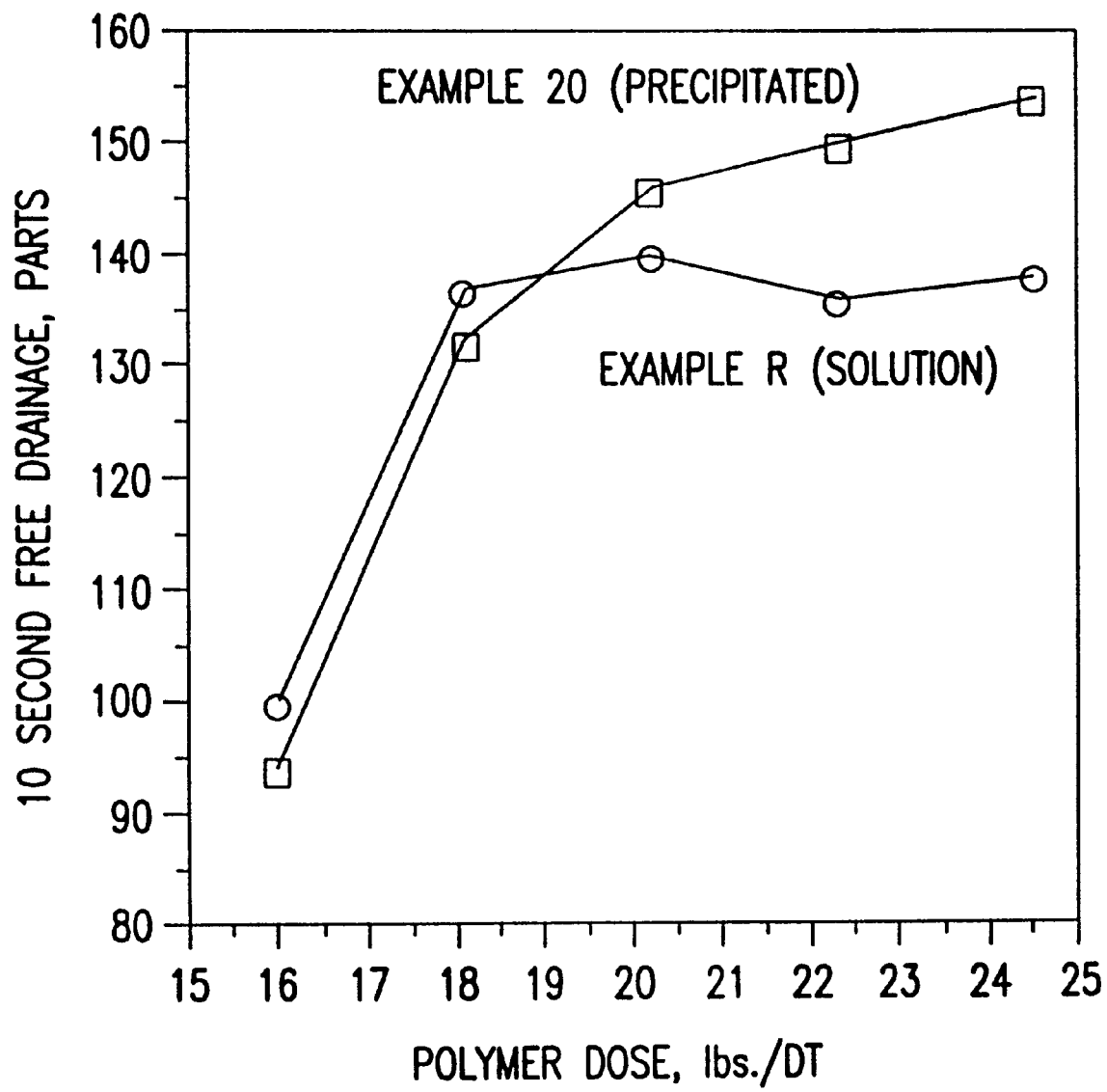

FIG. 11 is a plot of the 10 second free drainage of flocculated sludge (suspended solids from a biologically treated suspension) as a function of polymer dose, where the dose is expressed in units of pounds of polymer per dry ton of sludge solids. "Precipitated polymer" is a composition formed by the process of Example 20, and "solution polymer" is a composition formed by the process of Example R.

DETAILED DESCRIPTION OF THE PREFERRED EMBODIMENTS

Surprisingly, it has been discovered that the precipitation of water-soluble cationic polymers by chaotropic salts, or anionic organic salts, is enhanced by the addition of kosmotropic salts. This is surprising because the effects of the salts are generally considered to be additive. If the salt effects were additive, it would be expected that the solubilizing effects of an chaotropic salt e.g. sodium thiocyanate, on a particular substance in water would be countered or canceled by the effects of a strongly kosmotropic salt such as $(NH_4)_2SO_4$. Quite to the contrary, it has now been discovered that these effects tend to be synergistic, so that cationic water-soluble polymers are precipitated more effectively by a combination of chaotropic and kosmotropic salts than by either salt alone.

For the purposes of this invention, a polymer is precipitated in a particular salt solution if the particular polymer does not dissolve to form a clear, homogeneous, solution when the particular polymer is stirred or agitated, for periods of up to about a week, in the salt solution at a particular temperature. A polymer is also considered to be precipitated when a solution of a polymer or polymers in the salt solution develops cloudiness or turbidity, when the temperature of the solution is changed. It is obvious from the foregoing that solubility of a polymer or polymers in a particular salt solution may be temperature dependent, so that a polymer may be precipitated in a particular salt solution at low temperatures, but dissolved at higher temperatures, or vice-versa. The polymer or polymers, salt or salts, and water may be mixed in any order, or polymerization may be conducted in the presence of the salts, or part of the salts, in order to determine the solubility of the polymer in the salt solution. The polymer may be considered to be precipitated if all or if only part e.g. 10% or more, of the polymer is precipitated.

Those skilled in the art understand that the solubility of cationic, water-soluble polymers is often determined by measuring the cloud point of the polymer in salt solution. The cloud point of a particular polymer in a particular salt solution is defined, for the purposes of this invention, as the temperature at which a substantially clear solution of the polymer becomes cloudy as it is cooled. For instance, a composition comprised of at least one water-soluble, cationic polymer, water, and the salt mixture may be heated to dissolve the polymer, forming a substantially clear solution. The solution may then be allowed to cool slowly, until the polymer begins to precipitate or phase separate and the solution becomes cloudy or turbid. The temperature at which the solution begins to become cloudy is the cloud point. The reproducibility of cloud points determined in this way is generally about ±3° C. Polymers which are less soluble have higher cloud points, and polymers which are more soluble have lower cloud points. In some cases, cloud points are difficult to measure conveniently, because the polymers are so insoluble that they cannot be solubilized by heating, even on heating to about 100° C., or above. At ambient pressure, 100° C. is close to the boiling point of the aqueous solution, so measurements at higher temperatures are impractical. Likewise, some polymers are so soluble that they do not precipitate, even on cooling to below about 0° C., which is the practical limit for cloud point measurements because of freezing.

Occasionally, a situation is encountered in which a polymer precipitates from salt solution on heating, instead of on cooling. In these cases, the cloud point of a particular polymer in a particular salt solution is defined, for the purposes of this invention, as the temperature at which a solution of the polymer begins to become cloudy as it is heated. Hereinbelow, all cloud points were obtained on cooling, except as otherwise noted.

Polymerization of the monomers may be conducted in the presence of the salt mixture. For instance, amounts of water, monomers and salts can be mixed together and subjected to polymerization conditions. Cloud points may then be determined as above. Polymerizing the monomers in the presence of the salt, may be preferable, particularly at high polymer concentration or high polymer molecular weight, because of the difficulty of adequately mixing the polymer with the salt solution. Th s technique may also be preferable when the cloud point is above 100° C.

The effective amounts of chaotropic salt, or anionic organic salt, and effective amounts of kosmotropic salt required to cause precipitation or phase separation of cationic water-soluble polymers depend on a number of factors, including the temperature, the inherent solubility of the polymer, the concentration of the polymer, the particular chaotropic salt, or anionic organic salt, used, and the particular kosmotropic salt used. The amount of chaotropic salt, or anionic organic salt, also depends on the amount of kosmotropic salt. For example, Table 1 shows the cloud points of 0.5% poly(DMAEM.MeCl) as a function of sodium thiocyanate concentration and $(NH_4)_2SO_4$ concentration, where the concentrations are expressed as weight percent on total. Hereinbelow, all concentrations, unless otherwise noted, are expressed as weight percent of total weight. The data from Table 1 are plotted in FIG. 1. For each curve in FIG. 1, note that the poly(DMAEM.MeCl) is insoluble at the temperatures below the curve and soluble at temperatures above the curve. At NaSCN concentrations below about 1%, poly(DMAEM.MeCl) is not precipitated, even at about 10% $(NH_4)_2SO_4$.

TABLE 1

Cloud points of 0.5% poly(DMAEM.MeCl) as a function of Wt. % NaSCN and Wt. % $(NH_4)_2SO_4$

| NaSCN, wt % | Cloud Point, ° C. No $(NH_4)_2SO_4$ | Cloud Point, ° C. 5% $(NH_4)_2SO_4$ | Cloud Point, ° C. 10% $(NH_4)_2SO_4$ |
|---|---|---|---|
| 1.62 | 14 | 12 | 23 |
| 3.24 | 28 | 38 | 60 |
| 4.05 | 29 | 46 | 74 |
| 4.86 | 27 | 51 | 82 |

TABLE 1-continued

Cloud points of 0.5% poly(DMAEM.MeCl) as a function of Wt. % NaSCN and Wt. % $(NH_4)_2SO_4$

| NaSCN, wt % | Cloud Point, ° C. No $(NH_4)_2SO_4$ | Cloud Point, ° C. 5% $(NH_4)_2SO_4$ | Cloud Point, ° C. 10% $(NH_4)_2SO_4$ |
|---|---|---|---|
| 6.49 | 17 | 52 | 95 |
| 8.11 | 5 | 44 | 96 |
| 9.73 |  | 31 | 96 |

To achieve a particular degree of polymer insolubility for a particular water-soluble polymer, Table 1 (FIG. 1) shows that one can manipulate the amount of chaotropic salt, or anionic organic salt, the amount of kosmotropic salt, the temperature, or some combination thereof. Without $(NH_4)_2SO_4$, the cloud points of poly(DMAEM.MeCl) reach a maximum of about 30° C. at a NaSCN concentration of about 4%. At this point, further addition of chaotropic NaSCN increases the solubility of the polymer, as the cloud point decreases. In this case, there is an effective amount of sodium thiocyanate ranging from about 3% to about 5%, which causes precipitation of the polymer at room temperature. It is clear to one skilled in the art that the range may be broadened by reducing the temperature, or by increasing the concentration of $(NH_4)_2SO4$.

Figure 2:
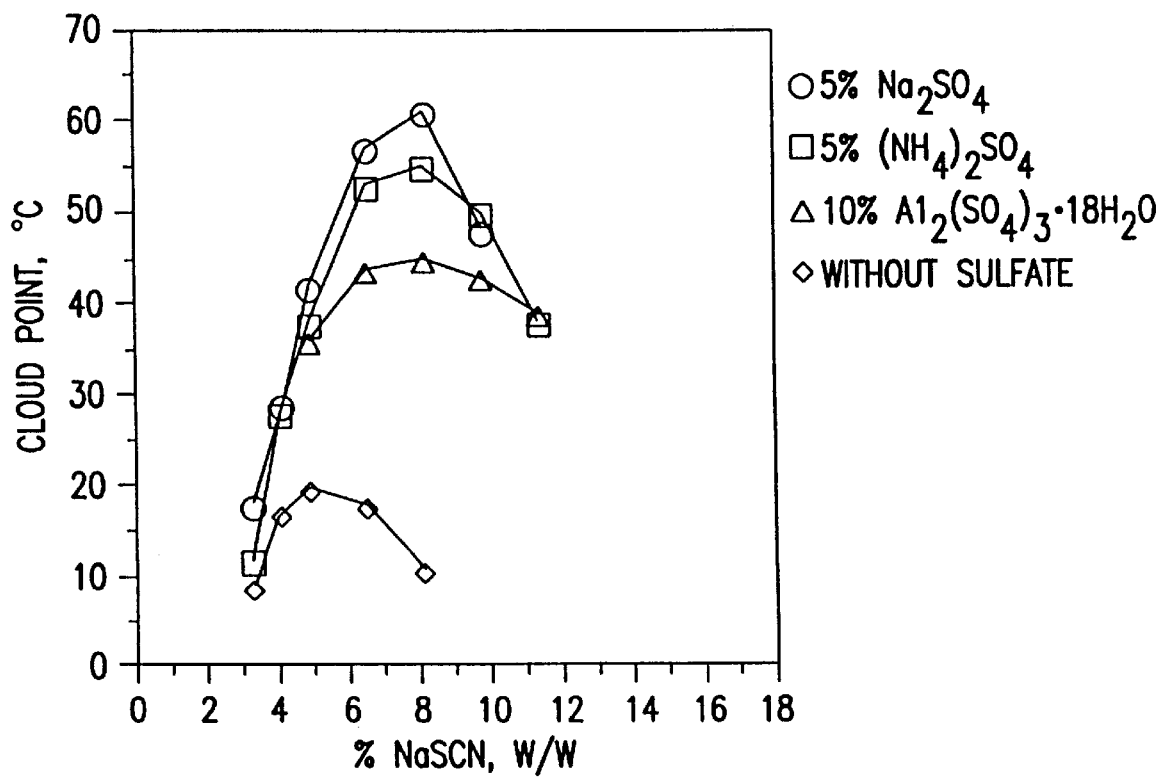
FIG. 2 is a plot of the cloud points of 5 wt % poly (DMAEM.MeCl) as a function of wt % NaSCN and type of kosmotropic salt.
Figure 3:
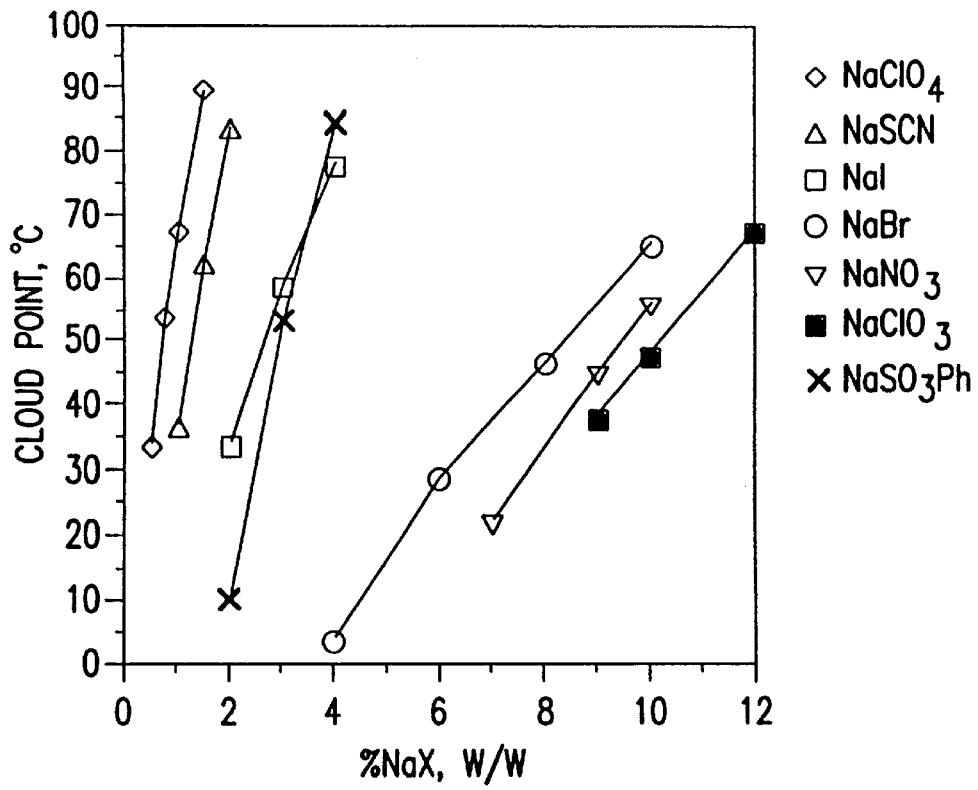
FIG. 3 is a plot of the cloud points of 0.5 wt % poly (DMAEM.MeCl) as a function of chaotropic salt concentration in 20 wt % $(NH_4)_2SO_4$.

The data in Tables 2 and 3 show that the particular type of kosmotropic salt and the particular type of chaotropic salt, respectively, may also influence the cloud points of poly (DMAEM.MeCl). The data from Tables 2 and 3 are plotted in FIGS. 2 and 3, respectively. For this particular polymer at this particular concentration, FIG. 2 shows that, for equal amounts by weight, $Na_2SO_4$ tends to give higher cloud points than $(NH_4)_2SO_4$. In turn, $(NH_4)_2SO_4$ tends to give higher cloud points than $Al_2(SO_4)_3 \cdot 18H_2O$, even when larger amounts, by weight, of $A_2(SO_4)_3 \cdot 18H_2O$ are used, depending on the concentration of NaSCN. The cloud points of poly(DMAEM.MeCl) in the absence of kosmotropic salt are shown for comparison. FIG. 3 indicates that some chaotropic salts are more effective than others, and that the order of effectiveness is roughly opposite to the order expected on the basis of the Hofmeister series; e.g. the most effective salts for insolubilizing poly(DMAEM.MeCl) tend to be the most strongly chaotropic salts, whereas the less effective salts tend to be less strongly chaotropic. Note the effectiveness of sodium benzenesulfonate ($NaSO_3Ph$), an anionic organic salt which will be discussed below.

TABLE 2

Cloud points of 5% poly(DMAEM.MeCl) as a function of NaSCN concentration and type of kosmotropic salt

| Wt. % NaSCN | Cloud Point, ° C. No sulfate | Cloud Point, ° C. 5% $(NH_4)_2SO_4$ | Cloud Point, ° C. 5% $Na_2SO_4$ | Cloud Point, ° C. 10% $Al_2(SO_4)_3.18H_2O$ |
|---|---|---|---|---|
| 3.24 | 9 | 12 | 18 |  |
| 4.05 | 17 | 28 | 29 |  |
| 4.86 | 20 | 38 | 42 | 36 |
| 6.49 | 18 | 53 | 57 | 44 |
| 8.11 | 11 | 55 | 61 | 45 |
| 9.73 |  | 50 | 48 | 43 |

TABLE 3

Cloud points of 0.5% poly(DMAEM.MeCl) as a function of NaX concentration in 20% $(NH_4)_2SO_4$

| Wt. % NaX | Cloud Point, °C. X = I | Cloud Point, °C. X = Br | Cloud Point, °C. X = SCN | Cloud Point, °C. X = ClO$_4$ | Cloud Point, °C. X = NO$_3$ | Cloud Point, °C. X = SO$_3$Ph | Cloud Point, °C. X = ClO$_3$ |
|---|---|---|---|---|---|---|---|
| 0.5  |    |    |    | 34 |    |    |    |
| 0.75 |    |    |    | 54 |    |    |    |
| 1    |    |    | 37 | 68 |    |    |    |
| 1.5  |    |    | 63 | 90 |    |    |    |
| 2    | 34 |    | 84 |    |    | 11 |    |
| 3    | 59 |    |    |    |    | 54 |    |
| 4    | 78 | 4  |    |    |    | 85 |    |
| 5    |    |    |    |    |    |    |    |
| 6    |    | 29 |    |    |    |    |    |
| 7    |    |    |    |    | 22 |    |    |
| 8    |    | 47 |    |    |    |    |    |
| 9    |    |    |    |    | 45 |    | 38 |
| 10   |    | 66 |    |    | 56 |    | 48 |
| 12   |    |    |    |    |    |    | 68 |

Figure 4:
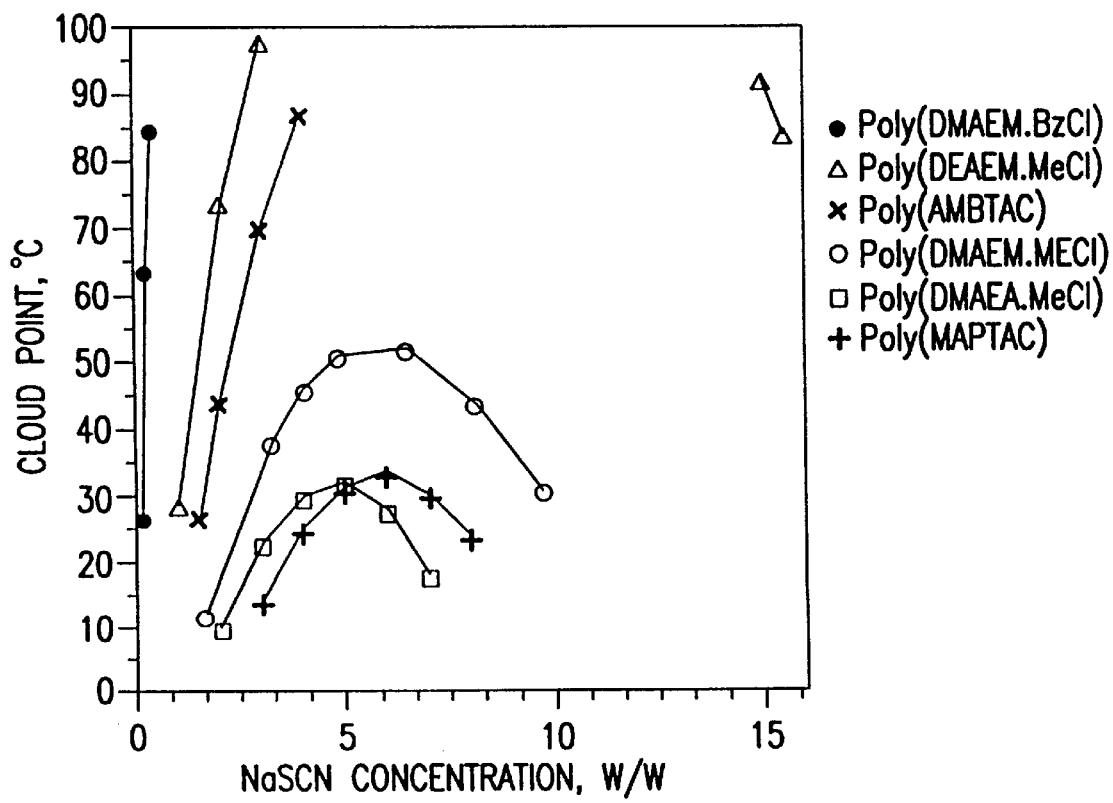
FIG. 4 is a plot of the cloud points of six 0.5 wt % cationic polymers as a function of NaSCN concentration in 5 wt % $(NH_4)_2SO_4$.

Table 4, plotted in FIG. 4, shows the cloud points of 0.5% solutions of various water-soluble, cationic polymers as a function of NaSCN concentration in 5% $(NH_4)_2SO_4$ solution. Even though all of these polymers are highly water-soluble and not hydrophobic per se, some of the polymers may be considered more hydrophobic than others because they have a higher content of hydrophobic groups. In general, polymers which are more hydrophobic tend to have higher cloud points for a given combination of chaotropic salt, or anionic organic salt, and kosmotropic salt. For instance, FIG. 4 shows that the cloud points of poly(DMAEM.BzCl), which contains hydrophobic benzyl groups, are quite high, even at very low NaSCN concentrations. At higher NaSCN concentrations, the cloud points were not determined because the poly(DMAEM.BzCl) did not dissolve even at 100° C. At the other extreme, less hydrophobic polymers such as poly(DMAEA.MeCl) and poly(MAPTAC) had much lower cloud points. Polymers with intermediate hydrophobicity such as poly(DMAEM.MeCl) and poly(AMBTAC) had cloud points that were intermediate between poly(DMAEM.BzCl) and poly(DMAEA.MeCl). Cationic copolymers and terpolymers may also be precipitated using the compositions and processes of this invention. For instance, Table 5 (plotted in FIG. 5) shows the cloud points of poly(DMAEA.MeCl) and a AMD/DMAEA.MeCl/EA terpolymer (obtained by polymerizing 45 mole % acrylamide (AMD), 45 mole % DMAEA.MeCl and 10 mole % ethyl acrylate (EA)) in 5% $(NH_4)_2SO_4$ as a function of NaSCN concentration.

TABLE 4

Cloud Points of 0.5% Cationic Polymers as a Function of NaSCN Concentration in 5% $(NH_4)_2SO_4$

| Wt. % NaSCN | Cloud Point, °C. poly(DMAEM.BzCl) | Cloud Point, °C. poly(DEAEM.MeCl) | Cloud Point, °C. poly(AMBTAC) | Cloud Point, °C. poly(DMAEM.MeCl) | Cloud Point, °C. poly(DMAEA.MeCl) | Cloud Point, °C. poly(MAPTAC) |
|---|---|---|---|---|---|---|
| 0.15 | 27 |    |    |    |    |    |
| 0.3  | 64 |    |    |    |    |    |
| 0.4  | 85 |    |    |    |    |    |
| 1.0  |    | 29 |    |    |    |    |
| 1.5  |    |    | 27 |    |    |    |
| 1.62 |    |    |    | 12 |    |    |
| 2.0  |    | 74 | 44 |    | 10 |    |
| 3.0  |    | 98 | 70 |    | 23 | 14 |
| 3.24 |    |    |    | 38 |    |    |
| 4.0  |    |    | 87 |    | 30 | 25 |
| 4.05 |    |    |    | 46 |    |    |
| 4.86 |    |    |    | 51 |    |    |
| 5.0  |    |    |    |    | 32 | 31 |
| 6.0  |    |    |    |    | 28 | 33 |
| 6.49 |    |    |    | 52 |    |    |
| 7.0  |    |    |    |    | 18 | 30 |
| 8.0  |    |    |    |    |    | 24 |
| 8.11 |    |    |    | 44 |    |    |
| 9.73 |    |    |    | 31 |    |    |
| 15   |    | 92 |    |    |    |    |
| 15.5 |    | 84 |    |    |    |    |

TABLE 5

Cloud Points of Poly(AMD/DMAEA.MeCl/EA) (45/45/10 mole %) and Poly(DMAEA.MeCl) in 5% $(NH_4)_2SO_4$ as a Function of NaSCN Concentration

| Wt. % NaSCN | Cloud Point, ° C. poly(DMAEM.MeCl) | Cloud Point, ° C. poly(AMD/DMAEA.MeCl/EA) |
|---|---|---|
| 2 | 3 | 10 |
| 3 | 15 | 23 |
| 4 | 21 | 30 |
| 5 | 23 | 32 |
| 6 | 24 | 28 |
| 7 | 30 | 18 |
| 8 | 17 | |

Table 6 (FIG. 6) shows the cloud points of two polymers as a function of polymer concentration (0.5%, 5%, 15%, and 20%) and NaSCN concentration in 5% $(NH_4)_2SO_4$. This data shows that the cloud points may also be affected by the concentration and by the counterion of the cationic polymer. FIG. 6(a) shows the cloud points of poly(DMAEM.MeCl) as a function of NaSCN (concentration in 5% $(NH_4)_2SO_4$. Poly(DMAEM.MeCl) is the polymer obtained by polymerizing the methyl chloride quaternary salt of dimethylaminoethylmethacrylate. As the polymer concentration increases, the amount of NaSCN needed to produce a particular cloud point also tends to increase. FIG. 6(a) shows the cloud points of poly(DMAEM.DMS), which is the polymer obtained by polymerizing the dimethyl sulfate quaternary salt of dimethylaminoethylmethacrylate. Note that the change in the amount of NaSCN required to give a certain cloud point is different for the two polymers, which are substantially the same except for the identity of the counterion.

TABLE 6

Poly (DMAEM.MeCl) and Poly (DMAEM.DMS) Cloud Points as a Function of NaSCN Concentration at 5% $(NH_4)_2SO_4$ and Various Polymer Concentrations

| Wt. % NaSCN | Poly (DMAEM.MeCl) Cloud Points, ° C. | | | | Poly (DMAEM.DMS) Cloud Points, ° C. | | | |
|---|---|---|---|---|---|---|---|---|
| | 0.5% | 5% | 15% | 20% | 0.5% | 5% | 15% | 20% |
| 1.62 | 12 | | | | | | | |
| 2.0 | | | | | 21 | | | |
| 3.0 | | | | | 35 | 21 | | |
| 3.24 | 38 | 12 | | | | | | |
| 4.0 | | | | | 45 | 34 | | |
| 4.05 | 46 | 28 | | | | | | |
| 4.86 | 51 | 38 | | | | | | |
| 5.0 | | | | | 49 | 43 | 27 | |
| 6.0 | | | | | 51 | 48 | 40 | 36 |
| 6.49 | 52 | 53 | 35 | | | | | |
| 7.0 | | | | | 49 | 49 | 43 | 44 |
| 8.0 | | | | | 43 | 47 | 46 | 47 |
| 8.11 | 44 | 55 | 53 | | | | | |
| 9.0 | | | | | | 42 | | 48 |
| 9.73 | 41 | 50 | 64 | | | | | |
| 10.0 | | | | 68 | | 34 | 42 | 46 |
| 11.35 | | 38 | 67 | | | | | |
| 12.0 | | | | 82 | | | 27 | 36 |
| 12.97 | | | 60 | | | | | |
| 14.0 | | | | 86 | | | | |
| 16.0 | | | | 78 | | | | |
| 18.0 | | | | 67 | | | | |

Effective amounts of anionic organic salt which will insolubilize a particular cationic water-soluble polymer, in the presence of kosmotropic salt, are generally in the range of from about 0.1% to about 40%, preferably from about 0.5% to about 35%, most preferably from about 1% to about 30%. In the case of chaotropic salts, effective amounts of chaotropic salt which will insolubilize a particular cationic water-soluble polymer, in the presence of kosmotropic salt, are generally in the range of about 0.5% to about 250%, preferably in the range of about 1% to about 200%, more preferably in the range of about 7% to about 150%, most preferably in the range of about 10% to about 100%, by weight, based on the weight of the polymer. Effective amounts of kosmotropic salt useful in admixture with the anionic organic salt and/or the chaotropic salt are in the range of about 0.1% to about 30%, preferably from about 1% to about 27%, more preferably from about 10% to about 25%. Preferably, the salts are soluble in the solution, so the upper limits to salt content are determined mainly by the capacity of the solution to dissolve the salt, which is, in turn, affected by the temperature and the amount of polymer in the composition. The effective amounts of chaotropic salt, or anionic organic salt, and effective amounts of kosmotropic salt useful for precipitating a particular polymer at a particular temperature may be found by routine experimentation, following the trends established in the results discussed herein.

When conducting a polymerization of monomers in the presence of chaotropic salt, or anionic organic salt, and kosmotropic salt, effective amounts of anionic organic salt which will insolubilize the resulting cationic water-soluble polymer, in the presence of kosmotropic salt, are generally in the range of from about 0.2% to about 50%, preferably from about 0.5% to about 40%, more preferably from about 1% to about 35%, most preferably from about 5% to about 25%. In the case of chaotropic salts, Effective amounts of chaotropic salt which will insolubilize the resulting cationic water-soluble polymer, in the presence of kosmotropic salt, are generally in the range of about 0.1% to about 250%, preferably in the range of about 2% to about 220%, more preferably in the range of about 8% to about 150%, most preferably in the range of about 10% to about 100%, by weight, based on the weight of the monomers. Effective amounts of kosmotropic salt useful in admixture with the anionic organic salt and/or the chaotropic salt are in the range of about 0.5% to about 30%, preferably from about 1% to about 28%, more preferably from about 5% to about 25%. Preferably, the salts are soluble at the end of the polymerization, so the upper limits to salt content are determined mainly by the capacity of the solution to dissolve the salt, which is, in turn, affected by the temperature and the amount of polymer in the composition. The effective amounts of chaotropic salt, or anionic organic salt, and effective amounts of kosmotropic salt useful when conducting a polymerization of monomers at a particular temperature may be found by routine experimentation, following the trends established in the results discussed herein.

The chaotropic salts useful in this invention may be any chaotropic salt including thiocyanates, perchlorates, chlorates, bromates, bromides, iodides and nitrates. The counterion to the anion has a relatively small effect on the solubility of the cationic polymer, and may be ammonium or any alkali metal cation such as lithium, sodium or potassium, or an alkaline earth metal cation. Sodium thiocyanate, potassium thiocyanate, ammonium thiocyanate, sodium perchlorate, sodium chlorate, sodium bromide, sodium iodide and sodium nitrate are preferred. Mixtures of chaotropic salts are useful, and may provide a benefit when used with the kosmotropic salt. For instance, Table 7 (FIG. 7) shows the cloud points of 0.5% poly(DMAEM.MeCl) as a function of the amount of NaI in a mixture of NaI and NaBr, in 20% (NH$_4$)$_2$SO$_4$. The total weight of chaotropic salt, NaI+NaBr, was held constant at 4% of the total weight. In this case, the cloud points did not follow the simple "rule of mixtures" behavior that would be expected if each chaotropic salt influenced the cloud point in proportion to its weight fraction in the solution; i.e., the cloud point curve is not linear as a function of the amount NaI in the mixture, and instead shows that cloud points which are advantageously higher than would be expected based on the "rule of mixtures" can be obtained by using a mixture of chaotropic salts.

TABLE 7

Cloud Points of 0.5% Poly (DMAEM.MeCl) in 20% (NH$_4$)$_2$SO$_4$ and 4% NaI/NaBr Mixture as a Function of Weight Fraction NaI in Mixture

| Wt. Fraction NaI in NaI/NaBr Mixture | Cloud Point, ° C. |
|---|---|
| 0 | 4 |
| 0.25 | 32 |
| 0.5 | 52 |
| 0.75 | 67 |
| 1 | 79 |

The kosmotropic salts useful in the instant invention can be any kosmotropic salt including sulfates, phosphates, fluorides, citrates, acetates, tartrates, and hydrogenphosphates. The counterion has a small effect on the solubility of the polymer as shown in Table 2 (FIG. 2), and may be ammonium or any alkali or alkaline earth metal such as lithium, sodium, potassium, magnesium, calcium, etc. The counterion may also be aluminum, as shown in Table 2 (FIG. 2), or may be a transition metal cation such as manganese or iron. Preferred kosmotropic salts are ammonium sulfate and sodium sulfate. Mixtures of kosmotropic salts are also effective and may be preferred.

It has also been discovered that anionic organic salts, such as anionic hydrotropic salts and anionic surfactants, also precipitate cationic polymers, when used in conjunction with kosmotropic salts. Anionic organic salts with the (general structure R-A$^-$M$^+$, where R comprises ester, alkyleneoxy, alkyl, or substituted alkyl with from about 1 to about 22 carbons, or aryl or substituted aryl with from about 6 to about 22 carbons, A is an anionic group such as carboxylate, sulfonate, or sulfate group, and M is a metal or ammonium, are useful for the precipitation of cationic polymers, in the presence of kosmotropic salts. The R group may be straight or branched, and may be substituted with more than one anionic group A. The anionic group A may be substituted with more than one R group. Mixtures of anionic organic salts with each other, or with chaotropic salts, are also useful, in admixture with a kosmotropic salt or salts. Exceptions, to the foregoing are the acetate, citrate and tartrate anions, which tend to be kosmotropic.

Preferred anionic organic salts contain anions such as trichloroacetate and trifluoromethanesulfonate; also sulfonates and disulfonates such as methanesulfonate, ethanesulfonate, propanesulfonate, butanesulfonate, butanedisulfonate, pentanesulfonate, hexanesulfonate, hexanedisulfonate, and octanedisulfonate; also aryl and substituted aryl sulfonates and disulfonates such as benzenesulfonate, nitrobenzenesulfonate, xylenesulfonate, toluenesulfonate, benzenedisulfonate, naphthalenesulfonate, etc. and the like. Other preferred organic salts contain anions such as dialkylsulfosuccinate, dicycloalkylsulfosuccinate, diarylsulfosuccinate, diisobutylsulfosuccinate, diisooctylsulfosuccinate, dimethylsulfosuccinate, diethylsulfosuccinate, and diisopropylsulfosuccinate. Sodium hexanesulfonate, sodium benzenesulfonate, and sodium xylenesulfonate are more preferred. Sodium benzenedisulfonate, sodium butanedisulfonate, sodium hexanedisulfonate, sodium octanedisulfonate, and sodium decanedisulfonate are most preferred.

Tables 8 and 9 (FIGS. 8 and 9, respectivey) show the cloud points of 0.5% poly(DMAEM.MeCl) as a function of anionic organic salt concentration, without (NH$_4$)$_2$SO$_4$ (Table 8 and FIG. 8) and with about 20% (NH$_4$)$_2$SO$_4$ (Table 9 and FIG. 9). Table 8 (FIG. 8) shows that, at concentrations of up to about 5% anionic organic salt, the naphthalenesulfonates, xylenesulfonate and nitrobenzenesulfonate cause precipitation of 0.5% poly(DMAEM.MeCl) in the absence of (NH$_4$)$_2$SO$_4$. The effectiveness of the anionic organic salts is further enhanced, as evidenced by the increase in cloud points, by the presence of 20% (NH$_4$)$_2$SO$_4$ (Table 9 and FIG. 9). Table 9 and FIG. 9 also demonstrate the ability of two other anionic organic salts, sodium trichloroacetate and sodium benzenesulfonate, to precipitate poly(DMAEM.MeCl) in the presence of (NH$_4$)$_2$SO$_4$.

TABLE 8

Cloud Points of 0.5% Poly (DMAEM.MeCl) as a Function of Anionic Organic Salt Concentration, No (NH$_4$)$_2$SO$_4$

| Wt. % Anionic Organic Salt | Cloud Point, ° C. Sodium 2-Naphthalene Sulfonate | Cloud Point, ° C. Sodium 1-Naphthalene Sulfonate | Cloud Point, ° C. Sodium Xylene Sulfonate | Cloud Point, ° C. Sodium 3-Nitrobenzene Sulfonate |
|---|---|---|---|---|
| 0.75 | 19 | | | |
| 1 | 62 | 30 | | |
| 1.25 | 80 | 61 | | |
| 1.5 | 92 | 78 | | |
| 2 | | | | 26 |
| 2.5 | | | | 46 |
| 3 | | | | |
| 3.2 | | | 35 | |
| 3.25 | | | 47 | |
| 3.5 | | | 55 | 74 |
| 4 | | | 76 | 84 |
| 4.5 | | | | 93 |
| 5 | | | 96 | |

TABLE 9

Cloud Points of 0.5% Poly (DMAEM.MeCl) as a Function of Anionic Organic Salt Concentration, 20% $(NH_4)_2SO_4$

| Wt. % Anionic Organic Salt | Cloud Point, °C. Sodium 2-Naphthalene Sulfonate | Cloud Point, °C. Sodium 1-Naphthalene Sulfonate | Cloud Point, °C. Sodium Xylene Sultonate | Cloud Point, °C. Sodium 3-Nitrobenzene Sulfonate | Cloud Point, °C. Sodium benzene Sulfonate | Cloud Point, °C. Sodium Trichloro-Acetate |
|---|---|---|---|---|---|---|
| 0.5 | 7 | | | | | |
| 0.6 | 41 | 30 | | | | |
| 0.75 | 74 | 57 | | | | |
| 1.0 | | 83 | | 9 | | |
| 1.25 | | | 29 | | | |
| 1.5 | | | 56 | | | |
| 2.0 | | | 85 | 50 | 11 | |
| 3.0 | | | | 81 | 54 | 35 |
| 3.5 | | | | | | 59 |
| 4.0 | | | | | 85 | 74 |

Table 10 (FIG. 10) shows the cloud points of a copolymer comprised of 45 mole % acrylamide and 55 mole % poly (DMAEA.MeCl) as a function of DIBSS and $(NH_4)_2SO_4$ concentration. The concentration of the copolymer, abbreviated as poly(45-AMD/55-DMAEA.MeCl), was 0.5%. Note that increasing the $(NH_4)_2SO_4$ concentration from 5% to 15% decreased the amount of DIBSS useful for insolubilizing the polymer.

TABLE 10

Cloud Points of 0.5% Poly(45-AMD/55-DMAEM.MeCl) as a Function of Wt. % DIBSS at Different $(NH_4)_2SO_4$ Levels

| Wt. % DIBSS | Cloud Point, °C., 5% $(NH_4)_2SO_4$ | Cloud Point, °C., 15% $(NH_4)_2SO_4$ |
|---|---|---|
| 0.66 | | 50 |
| 0.81 | | 75 |
| 0.93 | | 91 |
| 2.02 | 55 | |
| 2.13 | 68 | |
| 2.25 | 78 | |

The effective amounts of kosmotropic salt and anionic organic salt, including anionic hydrotropic salts and anionic surfactants, useful to cause precipitation or phase separation depend on the temperature, the inherent solubility of the polymer, the concentration of the polymer, the particular anionic organic salt used, and the particular kosmotropic salt used. The effective amount of anionic organic salt also depends on the amount of kosmotropic salt. When used without a kosmotropic salt, a greater amount of anionic organic salt is generally necessary to bring about a particular level of polymer insolubility than when a kosmotropic salt is present. The effective amounts of anionic organic salt and effective amounts of kosmotropic salt useful for precipitating a particular polymer at a particular temperature may be found by routine experimentation, following the trends established in the results discussed herein.

Polymers useful in the practice of this invention may be any water-soluble cationic polymer, including polymers made by the polymerization and copolymerization of cationic monomers, and polymers which become cationically charged after polymerization has occurred. The mole % of cationic recurring units, based on total moles of recurring units in the polymer, is generally from about 1 mole % to about 100 mole %, preferably from about 10 mole % to about 90 mole %, more preferably from about 20 mole % to about 80 mole %, most preferably from about 30 mole % to about 70 mole %. Polymers useful in this invention may include those having recurring units represented by the following general formula (I):

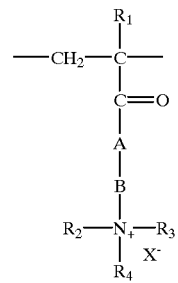

(I)

where $R_1$ is either hydrogen or $CH_3$, A is either an oxygen atom or NH, $R_2$ and $R_3$ are each, individually, an alkyl group having from about 1 to about 3 carbons, B is an alkylene or oxyalkylene group having 1 to 5 carbons, $R_4$ is an alkyl group or a substituted alkyl group having from about 1 to about 10 carbons, or an aryl or substituted aryl group having from about 6 to about 10 carbons, and X is an anionic counterion. Preferably, A is an oxygen atom, B has two carbons, $R_2$ and $R_3$ are methyl or ethyl, and $R_4$ is methyl, ethyl, or benzyl. More preferably, cationic polymers are prepared from, or contain recurring units corresponding to, quaternary salts of dialkylaminoalkyl(alk)acrylate, including the methyl chloride, dimethyl sulfate, alkyl halide, and benzyl chloride quaternary salts of such monomers as dimethylaminoethyl(meth)acrylate, diethylaminoethyl (meth)acrylate, etc. and the like. Other cationic polymers and copolymers such as poly(diallydialkylammonium halide), polyamines, and condensation polymers made from monomers such as epichlorohydrin and dimethylamine are also useful in the practice of this invention.

Monomers which may be copolymerize with the cationic monomers mentioned above may be cationic, nonionic or anionic. Cationic monomers include the monomers corresponding to (I) and other cationic monomers such as diallydimethylammonium chloride, diallydiethylammonium chloride, etc. Nonionic monomers may include substantially water-soluble monomers such as acrylamide, methacrylamide, and N-isopropylacrylamide, or monomers which are sparingly soluble in water such as t-butylacrylamide, N,N-dialkylacrylamide, diacetone acrylamide, ethyl acrylate, methyl methacrylate, methyl acrylate, styrene, butadiene, ethyl methacrylate, acrylonitrile, etc. and the like. Nonionic monomers may also include monomers which become charged at low pH, such as dimethylaminoethylacrylate, dimethylaminoethylmethacrylate, diethylaminoethylacrylate, diethylaminoethylmethacrylate and corresponding acrylamide derivatives such as methacrylamidopropyldimethylamine. Preferred nonionic monomers are acrylamide, t-butyl acrylamide, methacrylamide, methyl methacrylate, ethyl acrylate and styrene. Anionic monomers may include acrylic acid, 2-acrylamido-2-methylpropane sulfonic acid, styrene sulfonic acid, their salts and the like. On a mole basis, the polymer contains fewer anionic recurring units than cationic recurring units so that the polymer, although ampholytic, retains a net positive cationic charge. Preferably, the polymer contains less than 10 mole % anionic recurring units, based on the total number of recurring units in the polymer.

Polymers which become cationically charged e.g. by quaternization, after polymerization include homopolymers produced from such monomers as dimethylaminoethylacrylate, dimethylaminoethylmethacrylate, diethylaminoethylacrylate, diethylaminoethylmethacrylate and corresponding acrylamide derivatives such as methacrylamidopopyldimethylamine, as well as copolymers with any of the other monomers discussed hereinabove. Functionalized acrylamide polymers such as those Mannich or glyoxylated polymers produced in U.S. Pat. Nos. 5,132, 023; 5,037,881; 4,956,399; 4,956,400; which are incorporated herein by reference, are also useful in the practice of this invention.

The instant invention is most useful for precipitating polymers such as poly(DMAEM.MeCl) which do not contain hydrophobic groups e.g. benzyl groups which make it easier to precipitate the polymer, because such polymers may be difficult or impossible to precipitate using a kosmotropic salt alone. However, mixtures of chaotropic salt, or anionic organic salt, and kosmotropic salt may also be used to precipitate polymers which may precipitate in kosmotropic salt alone. The use of a salt mixture e.g chaotropic with kosmotropic may provide a benefit over the use of a kosmotropic salt alone because the salt mixture may precipitate the polymer more effectively e.g the cloud point may be higher, the overall salt level may be lower, the bulk viscosity may be lower e.g. of a polymer dispersion, etc.

For instance, a 1% solution of a terpolymer prepared by polymerizing 20 mole % DMAEA.MeCl, 20 mole % DMAEM.BzCl (benzyl chloride quaternary salt of dimethylaminoethylacrylate), and 60 mole % AMD may be precipitated in a solution that contains 30% ammonium sulfate, but may be soluble in a solution that contains 25% ammonium sulfate. From a practical point of view, it may be disadvantageous to use salt levels in excess of 25% to precipitate the polymer. However, the total salt content may be drastically lowered by using a mixture of an chaotropic salt and a kosmotropic salt. For instance, a 1% solution of the same terpolymer may be precipitated in a solution that contains 10% ammonium sulfate and 0.75% NaSCN, a total salt level of only 10.75%, vs. a total salt level of about 30% for ammonium sulfate alone.

Mixtures of one or more polymers may be precipitated by the practice of this invention. The polymers may be mixed together before, during or after being mixed with part or all of the salt solution. Mixtures of polymers may be separated from each other by utilizing a salt solution that tends to precipitate one or more polymers in the mixture, but is a solvent for one or more other polymers in the mixture.

Additional salts may be added before, during or after the precipitation process. A polymer or copolymer may also be formed by polymerization of the monomers in the presence of another polymer or polymers, which themselves may be either precipitated or soluble in the salt solution.

Polymerization of the monomers may be carried out in any manner known to those skilled in the art, including solution, bulk, precipitation, dispersion, suspension, emulsion, microemulsion, etc. Polymerization of the monomers may be carried out in the presence of part or all of the salt solution. Initiation may be effected with a variety of thermal and redox free radical initiators, including peroxides, e.g. t-butyl peroxide; azo compounds, e.g. azoisobisbutyronitrile; inorganic compounds, such as potassium persulfate and redox couples, such as ferrous ammonium sulfate/ammonium persulfate and sodium bromate/sulfur dioxide. Initiator addition may be may be effected any time prior to the actual initiation per se. Polymerization may also be effected by photochemical irradiation processes, such as by ultraviolet irradiation or by ionizing irradiation from a cobalt 60 source. The monomers may all be present when polymerzation is initiated, or part of the monomers may be added at a later stage of the polymerization. Polymerization may be conducted in multiple stages. Additional materials such as pH adjusting agents, stabilizers, chelating agents, sequestrants, etc. may also be added before, during or after polymerization.

The molecular weights of the polymers which are precipitated or phase separated by the practice of this invention are not particularly critical. The weight average molecular weights of the polymers may range from about 1,000 to about 100,000,000, preferably from about 100,000 to about 75,000,000, more preferably from about 1,000,000 to about 60,000,000. The concentration of the polymer in the composition may range from 0.01% to 90%, or occasionally even higher. It is generally preferred, for practical reasons such as the desire to keep production and shipping costs relatively low, for the level of polymer in the compositions to be as high as possible.

Compositions of the salt solutions, useful for precipitating cationic polymers, may be prepared by simply dissolving the desired salts in water, preferably with agitation. Waters useful in the practice of this invention are not particularly critical and can be from any source of water e.g. distilled water, tap water, recycled water, process water, well water, etc. Precipitation of the cationic polymer in the salt solution may be carried out by mixing, in any order, the salt solution and the polymer solution or polymer emulsion. A second, different water-soluble polymer may be mixed in to stabilize the precipitated polymer droplets by slowing or preventing settling. Substantially dry polymer granules of water-soluble polymer may be added to the salt solutions to form compositions comprising salts, water and precipitated polymer. Alternatively, the cationic water-soluble polymer may be formed by polymerization of the monomers in the presence of the salts. All or part of the polymer may be precipitated.

It is preferred to polymerize monomers in a salt solution to form a polymer dispersion. For the purposes of this invention, precipitated polymer is a polymer dispersion if some or all of the precipitated polymer is in the form of small droplets that are dispersed in the aqueous salt solution. The precipitated polymer droplets may contain salt and water. Some or all of the polymer may be precipitated. The droplet size may be in the range of from about 0.1 micron to about 1 millimeter, preferably from about 0.1 micron to about 100 microns, more preferably from about 0.1 micron to about 10 microns, and most preferably from about 0.1 micron to about 5 microns. As above, the monomer or monomers and salt or salts may be added in stages during the polymerization or may all be present at the start. Initiation of polymerization may be conducted in any manner, as described hereinabove.

The dispersed polymer droplets may tend to settle on standing. Surprisingly, it has been found that certain water-soluble polymers, which may be referred to herein as dispersants, tend to stabilize the droplets against settling. The polymer dispersant stabilizes the polymer dispersion, but does not cause the cationic water-soluble polymer to be precipitated. As discussed above, the salt combination causes the cationic water-soluble polymer to be precipitated. It has been found that polymers such as polyacrylamide and copolymers of acrylamide with amounts of cationic, nonionic and anionic monomers decrease the settling rate of dispersions. For instance, the polymerization of a mixture of 45 mole % acrylamide and 55 mole percent DMAEA.MeCl in the presence of about 6% sodium benzenedisulfonate and about 15% $(NH_4)_2SO_4$ gives a polymer dispersion containing the precipitated copolymer of acrylamide and DMAEA.MeCl. The polymer droplets tend to settle with time and may merge to form a layer that is separate from the aqueous phase. However, when the same polymerization is conducted in the presence of another water-soluble polymer e.g. polyacrylamide, or copolymers of acrylamide with cationic, anionic or nonionic monomers, the rate of settling is dramatically reduced.

The water-soluble polymer, which may act as a dispersant, may be mixed in before, during or after mixing together cationic water-soluble polymer, water and salts. Preferably, the polymerization of monomers in the presence of chaotropic salt, or anionic organic salt, and kosmotropic salt to form a precipitated water-soluble cationic polymer is conducted in the presence of one or more water-soluble polymers different from said cationic water-soluble polymer.

Polymers useful as dispersants may include polyacrylamide and other nonionic polymers, e.g. poly(methacrylamide), poly(vinyl alcohol), poly(ethylene oxide), etc. and the like. Generally, dispersants arm soluble or mostly soluble in the particular salt solution. It is generally preferable for the dispersant to have greater solubility in the particular salt solution than the precipitated polymer droplets which are being dispersed. Cationic polymers e.g. poly(MAPTAC), poly(DMAEA.MeCl), etc. and the like are useful as dispersants when the polymer to be precipitated is less soluble than the dispersant. Copolymers useful as dispersants may include copolymers of nonionic monomers e.g. acrylamide with up to about 99 mole %, preferably up to about 50 mole %, more preferably from about 5 to about 25 mole %, based on total moles of recurring units in the polymer, of a cationic comonomers e.g. DMAEA.MeCl, DMAEM.MeCl, diallydimethylammonium chloride, etc. Other copolymers useful as dispersants include copolymers of acrylamide with up to about 30 mole % of an anionic comonomer such as sodium 2-acrylamido-2-methylpropane sulfonic acid, preferably from about 5 to about 20% comonomer, based on total moles of recurring units in the polymer. Anionic comonomers may include acrylic acid, styrene sulfonic acid, their salts and the like. Nonionic comonomers may include substantially water-soluble monomers such as methacrylamide, or monomers which are sparingly soluble in water such as t-butylacrylamide, diacetone acrylamide, ethyl acrylate, methyl methacrylate, methyl acrylate, styrene, butadiene, ethyl methacrylate, acrylonitrile, etc. and the like. Nonionic comonomers may also include monomers which become charged at low pH, such as dimethylaminoethylacrylate, dimethylaminoethylmethacrylate, diethylaminoethylacrylate, diethylaminoethylmettiacrylate and corresponding acrylamide derivatives such as methacrylamidopropyldimethylamine. Preferred nonionic comonomers are acrylamide, t-butyl acrylamide, methacrylamide, methyl methacrylate, ethyl acrylate and styrene.

Dispersants which have a block or graft structure are particularly preferred. For instance, those skilled in the art realize that copolymers prepared by polymerizing acrylamide in the presence of poly(vinyl alcohol), using certain initiators e.g. $(NH_4)_2Ce(NO_3)_6$, result in block or graft copolymers. The poly(vinyl alcohol) may constitute up to about 50% of the weight of the copolymer, preferably form about 5% to about 30%.

Dispersants are generally used in amounts ranging up to about $25\%$, preferably about 1% to about 20%, more preferably about 5% to about 15%, based on the total weight of the precipitated cationic polymer droplets being dispersed. The dispersant is not used in amounts which cause the precipitation of the cationic polymer in the absence of chaotropic salts, or anionic organic salts, and kosmotropic salts. The weight average molecular weights of the dispersant polymers may range from about 1,000 to about 50,000,000, preferably from about 50,000 to about 10,000,000, more preferably from about 100,000 to about 5,000,000.

Routine experimentation used to identify an effective combination of chaotropic salt, or anionic organic salt, kosmotropic salt, and temperature that will precipitate a particular concentration of a particular cationic, water-soluble polymer may be carried out in a number of ways. One way is by the cloud point technique described above. For instance, to determine the cloud points of 1% poly (DMAEM.MeCl) one could prepare 30 samples of 1% aqueous poly(DMAEM.MeCl), each containing either 0%, 5%, 10%, 15%, or 20% ammonium sulfate, and either 0%, 2% 4%, 6% 8% or 10% sodium thiocyanate, in all combinations. The samples having 0% salt are control samples. The cloud points of each solution might then be determined by heating each sample to dissolve the polymer, then cooling until the solution turned cloudy. The cloudiness would indicate precipitation, and the temperature at which it occurred would be the cloud point. The process could be repeated for any other polymer, polymer concentration or salts. Typically, some of the samples would remain clear, even down to 0° C. or below, whereas others would remain cloudy on heating, even to 100° C. or above. Although one would not obtain cloud point information from these samples, one would know the phase behavior of the particular polymer for that particular salt system. In cases when precipitation was observed on heating, and the polymer dissolved on cooling, the cloud points might be determined by cooling the mixtures until the polymers dissolved, then heating to precipitate the polymer. In these cases, the cloud points would be the temperatures at which cloudiness was observed on heating.

Cloud points need not be measured to determine the effective amounts of chaotropic salt, or anionic organic salt, and kosmotropic salt for precipitating a particular water-soluble polymer at a particular temperature. For instance, one could prepare a series of solutions containing various amounts of chaotropic salt, or anionic organic salt, and kosmotropic salt, and then add a polymer solution to each salt solution. The polymer would either precipitate remain soluble, as determined by simple visual inspection, and the solubility behavior of the polymer could be correlated with the type and concentration of each salt. For instance, Examples 23–41 show that the total salt level useful for precipitating a cationic polymer may be lower when a mixture of chaotropic salt, or anionic organic salt, and kosmotropic salt is used, as compared to using a kosmotropic salt alone.

Another routine experimental process for identifying effective amounts of salts that will precipitate a particular cationic polymer at a particular temperature is to polymerize the monomers in the salt solution, then determine the cloud points. This technique is preferred at high concentrations of polymer, because concentrated solutions of polymers, e.g. 10% or greater, may be difficult to manipulate e.g. stir. The process is similar to the cloud point process in that one might make a series of salt solutions into which the monomer or monomers would be dissolved at concentrations necessary to provide the desired concentration of polymer. The solutions might then be polymerized in a known manner, e.g. sparged with inert gas such as nitrogen, then polymerization initiated by a conventional free radical initiator, to form mixtures of the polymers and salts. The cloud points of the mixtures could then be determined as above.

The routine experimental process for identifying effective amounts of salts that will not dissolve particular substantially dry, water-soluble polymer powders or granules at a particular temperature is similar to the process described above. One might also make a series of salt solutions as above, then add dry polymer to give a composition with the desired concentration of polymer. The mixtures might then be stirred and heated to effect dissolution of the polymer. Information could then be obtained, by direct observation, as to whether the polymer dissolved or did not dissolve in any particular solution; and temperature dependent phase behavior information could be obtained from those solutions which displayed a cloud point as described above.

The precipitated polymer may be recovered from the salt solution by any means known in the art, including filtration, centrifugation, evaporation, spray drying, combinations thereof, etc. The recovered polymer granules typically contain cationic water-soluble polymer, residual salts, optionally residual dispersant, and water. Preferably, the resulting polymer granules contain less than about 30% water, more preferably from about 0.1% to about 20%. Substantially dry, i.e. containing less than about 10% $H_2O$, free flowing polymer granules are preferred for handling purposes. Various pH adjusting agents, flow control agents, preservatives, particles size control agents, etc. that are known to those skilled in the art may be added, at any stage of the process, to give substantially cry granules containing cationic, water-soluble polymer.

The compositions and processes of this invention provide water-soluble cationic polymers that are useful in a number of applications e.g. the flocculation of dispersions of suspended solids, recovery of minerals from mining operations, papermaking, enhanced oil recovery, treatment of refinery waste, treatment of paper waste, treatment of food waste, etc. The dispersions of suspended solids may be biologically treated suspensions. To be effective in these applications, compositions of precipitated polymer may be added directly to a dispersion of suspended solids to be treated, mixed, and the resultant concentrated dispersion separated by means known in the art such as centrifuge, belt press, filter press, filter, etc. Preferably, the compositions are first diluted into water to form solutions having a cationic polymer concentration of about 0.01 to about 10%, preferably about 0.05 to about 5%, more preferably about 0.1 to about 3%. The dilute polymer solution may then be mixed in a known manner with the dispersion of suspended solids to be treated, and the resultant concentrated dispersion separated as above. It is known to those skilled in the art that the amount of dilute polymer solution effective for a particular application may be found through routine experimentation, as illustrated in Examples R and 20–22, below. A particularly preferred application is the treatment of dispersions of suspended solids which comprise a biologically treated suspension.

Substantially dry polymer granules and polymer dispersions are preferred because the small granule or droplet size of the polymer encourages the polymer to dissolve more quickly on dilution. It is believed that the polymer dissolves, in spite of the presence of the salts which tend to precipitate it, because the salt concentration is reduced from the effective range for precipitation to a range that allows for the polymer to dissolve, by dilution.

Another preferred application for the water-soluble cationic polymers of the instant invention is soil conditioning e.g. for the prevention of soil erosion. The process of irrigating a field may tend to cause the detrimental loss of valuable topsoil by erosion. Soil may be stabilized against erosion, particularly in situations wherein the soil is irrigated, by a process which comprises adding to the soil a soil-conditioning amount of an aqueous composition comprised of an effective amount of at least one chaotropic salt, or anionic organic salt, an effective amount of at least one kosmotropic salt, and at least one precipitated cationic water-soluble polymer. The addition of the polymer to the soil in a soil-conditioning amount tends to produce greater cohesiveness between the particles of soil, so that the soil is stabilized against erosion by wind, water, etc. Preferably, the composition is dissolved in water to form a conditioning solution, which may then be applied to the soil, preferably in addition to, or substituted for, the water typically used to irrigate a field. Alternatively, and less preferably, polymer dispersions or substantially dry polymer may be applied directly to the soil. In these cases, the polymer may form a conditioning solution when combined with water already present in the soil, or by the subsequent application of water to dissolve the polymer. In irrigation applications, soil-conditioning amounts generally range from about 0.1 to about 2° C. pounds of polymer per acre per year, preferably 0.5 to 10 pounds of polymer per acre per year.

Soil erosion may also take the form of large scale movements of soil e.g landslides, where the soil is not typically irrigated. For instance, the destruction of vegetation on a hillside by e.g fire may leave the underlying soil unstable and prone to movement. In these applications, means other than irrigation, such as spraying, may be used to apply the conditioning solutions. Alternatively, polymer dispersions or dry polymer may be applied directly to the soil. In these cases, the polymer may form a conditioning solution when combined with water already present in the soil, or by the subsequent application of water to dissolve the polymer.

The following examples are set forth for illustration purposes only and are not to be construed as limits on the present invention.

POLYMER STANDARD VISCOSITY

Standard viscosity is the viscosity of a 0.096% solution of water-soluble polymer in 1 N sodium chloride at 25° C. The viscosity is measured by a Brookfield LVT viscometer with a UL adapter at 60 rpm. The polymer solution being measured is made by diluting a polymer dispersion or solution to a concentration of 0.2% by stirring with the appropriate amount of deionized water during about twelve hours, and then diluting with the appropriate amounts of deionized water and sodium chloride.

EXAMPLE A

A 40% solution of poly(DMAEM.MeCl) was prepared as follows: 160 part of a 75% solution of DMAEM.MeCl, 140 parts of deionized water and 0.120 parts of 2,2'-azobis[2-(2-imidazdin-2-yl) propane] dihydrochloride, hereinbelow VA-044, an azo initiator, were added to an appropriate vessel. The solution was sparged with nitrogen gas and stirred for about one hour at ambient temperature. The nitrogen sparge was changed to a nitrogen purge, and polymerization was initiated thermally by raising the temperature of the solution to 44° C. Stirring and heating were continued for about 21 hours. The vessel was cooled to give a clear, viscous solution of poly(DMAEM.MeCl) having a standard viscosity of about 1.4 centipoise.

EXAMPLE B

A 20% solution of poly(DMAEM.MeCl) was prepared as follows: 80 parts of a 75% solution of DMAEM.MeCl, 220 parts of deionized water and 0.015 parts of VA-044 were added to a suitable glass vessel. The solution was sparged with nitrogen gas and the solution was stirred for about one hour at ambient temperature. The nitrogen sparge was changed to a nitrogen purge, and polymerization was initiated by exposing the glass vessel to a ultraviolet lamp. Stirring and heating were continued for about 3 hours to give a clear, viscous solution of poly(DMAEM.MeCl) having a standard viscosity of about 1.4 centipoise.

EXAMPLES C–D

The temperature dependent solubility behavior of poly (DMAEM.MeCl) prepared as in Example A was determined by measuring the cloud points in sodium thiocyanate solution as follows: The 40% poly(DMAEM.MeCl) polymer solution was diluted in deionized water to give a 1% solution. One part of the 1% polymer solution was added to a first clear glass vessel. A 3.24% solution of NaSCN was prepared in a second vessel, and 1 part of the 3.24% NaSCN solution was added to the first glass vessel containing 1 part of 10% poly(DMAEM.MeCl), with stirring. The resulting clear solution in the first vessel had a polymer concentration of 0.5% and a NaSCN concentration of 1.62%. The first vessel was cooled in an ice bath, and the polymer was observed to precipitate, as evidenced by the appearance of turbidity in the vessel, at a temperature of 16° C. Thus, the cloud point of 0.5% poly(DMAEM.MeCl) in 1.62% NaSCN was 16° C. Likewise, the cloud point of 0.5% poly (DMAEM.MeCl), prepared as in Example B, in 1.62% NaSCN was also 16° C.

EXAMPLE E

The procedure of Example C was repeated, except that the concentration of NaSCN in the second vessel was adjusted so that the resulting NaSCN concentration in the first vessel was 3.24%. In this case, turbidity indicative of precipitation was observed at ambient temperature. The first vessel was heated to dissolve the polymer, forming a clear solution. On cooling, turbidity indicative of precipitation was noted at 30° C. Thus, the cloud point of 0.5% poly(DMAEM.MeCl) in 3.24% NaSCN was 30° C.

EXAMPLE 1

The procedure of Example C was repeated, except that the solution in the second vessel contained 6.48% NaSCN and 10% $(NH_4)_2SO_4$. The resulting concentration of NaSCN in the first vessel was thus 3.24%, arid the resulting concentration of $(NH_4)_2SO_4$ was 5%. In this case, turbidity indicative of precipitation was observed at ambient temperature. The first vessel was heated to dissolve the polymer, forming a clear solution. On cooling, turbidity indicative of precipitation was noted at 38° C. Thus, the cloud point of 0.5% poly(DMAEM.MeCl) in 3.24% NaSCN and 5% $(NH_4)_2SO_4$ was 38° C., as compared to 30° C. (Example E) when the $(NH_4)_2SO_4$ was absent.

EXAMPLE 2

The procedure of Example C was repeated, except that the solution in the second vessel contained 6.48% NaSCN and 20% $(NH_4)_2SO_4$. The resulting concentration of NaSCN in the first vessel was thus 3.24%, and the resulting concentration of $(NH_4)_2SO_4$ was 10%. In this case, turbidity indicative of precipitation was observed at ambient temperature. The first vessel was heated to dissolve the polymer, forming a clear solution. On cooling, turbidity indicative of precipitation was noted at 60° C. Thus, the cloud point of 0.5% poly(DMAEM.MeCl) in 3.24% NaSCN and 10% $(NH_{42}SO_4$ was 60° C.

EXAMPLE 3

A 20% solution of poly(DMAEM.MeCl) was prepared in the presence of 5% NaSCN and 10% $(NH_4)_2SO_4$ by adding 80 parts of a 75% solution of DMAEM.MeCl, 15 parts NaSCN, 30 parts $(NH_4)_2SO_4$, 175 parts of deionized water and 0.060 part VA-044 to an appropriate vessel. The solution was sparged with nitrogen gas and stirred for about one hour at ambient temperature. The nitrogen sparge was changed to a nitrogen purge, and polymerization was initiated thermally by raising the temperature of the solution to 44° C. Stirring and heating were continued for about 21 hours, then cooled to give a white, opaque mixture. The mixture was heated to dissolve the polymer and formed a clear solution. On cooling, turbidity indicative of precipitation was observed at 39° C. Thus, the cloud point of 0.5% poly(DMAEM.MeCl) in 5% NaSCN and 10% $(NH_4)_2SO_4$ was 39° C. The standard viscosity of the polymer was 1.5 centipoise.

EXAMPLE F

The temperature dependent solubility behavior of poly (DMAEM.MeCl) prepared as in Example A was determined by measuring the cloud points in sodium 3-nitrobenzenesulfonate solution as follows: The 40% poly (DMAEM.MeCl) polymer solution was diluted in deionized water to give a 1% solution. One part of the 1% polymer solution was added to a clear glass vessel. 0.04 part sodium 3-nitrobenzenesulfonate and 0.96 part deionized water was added to the glass vessel containing 1 part of 1% poly (DMAEM.MeCl), with stirring. The resulting mixture had a polymer concentration of 0.5% and a sodium 3-nitrobenzenesulfonate concentration of 2.0%. The vessel was warmed to produce a clear solution, then allowed to cool. The polymer was observed to precipitate, as evidenced by the appearance of turbidity in the vessel, at a temperature of 26° C. Thus, the cloud point of 0.5% poly (DMAEM.MeCl) in 2.0% sodium 3-nitrobenzenesulfonate was 26° C.

EXAMPLE 4

The temperature dependent solubility behavior of poly (DMAEM.MeCl) prepared as in Example A was determined by measuring the cloud points in a solution containing $(NH_4)_2SO_4$ and sodium 3-nitrobenzenesulfonate as follows:

The 40% poly(DMAEM.MeCl) polymer solution was diluted in deionized water to give a 1% solution. One part of the 1% polymer solution was added to a clear glass vessel. 0.04 part sodium 3-nitrobenzenesulfonate, 0.4 part $(NH_4)_2SO_4$, and 0.56 part deionized water was added to the glass vessel containing 1 part of 1% poly DMAEM.MeCl), with stirring. The resulting mixture had a polymer concentration of 0.5%, a sodium 3-nitrobenzenesulfonate concentration of 2.0%, and an $(NH_4)_2SO_4$ concentration of 20%. The vessel was warmed to produce a clear solution, then allowed to cool. The polymer was observed to precipitate, as evidenced by the appearance of turbidity in the vessel, at a temperature of 81° C. Thus, the cloud point of 0.5% poly (DMAEM.MeCl) in 2.0% sodium 3-nitrobenzenesulfonate and 20% $(NH_4)_2SO_4$ was 81° C., as compared to 26° C. (Example F) when the $(NH_4)_2SO_4$ was absent.

EXAMPLE G

A 15% solution of poly[3-acrylamido(3-methylbutyl, trimethyl ammonium chloride],or poly(AMBTAC), was prepared as follows: 15 parts of AMBTAC monomer and 83 parts of deionized water were added to an appropriate vessel. The solution was sparged with nitrogen gas and stirred for about one hour at ambient temperature. The nitrogen sparge was changed to a nitrogen purge, and polymerization was initiated by adding 0.33 part of nitrogen-sparged 1% ammonium persulfate solution by syringe and 0.33 part of nitrogen-sparged 1% sodium bisulfite solution by syringe. An additional 0.33 part of nitrogen-sparged 1% ammonium persulfate solution and 0.33 part of nitrogen-sparged 1% sodium bisulfite solution were added by syringe after two hours, and another addition of the same amounts of the initiators was added four hours after the initial addition. Finally, 0.02 part VA-044 was added eight hours after the initial addition. Stirring was continued for about 18 hours. A clear, viscous solution of poly(AMBTAC) resulted.

EXAMPLE 5

The temperature dependent solubility behavior of poly (AMBTAC) prepared as in Example G was determined by measuring the cloud points in a solution containing $(NH_4)_2SO_4$ and sodium thiocyanate as follows: The 15% poly (AMBTAC) polymer solution was diluted in deionized water to give a 1% solution. One part of the 1% polymer solution was added to a clear glass vessel. 0.04 part sodium thiocyanate, 0.1 part $(NH_4)_2SO_4$, and 0.86 part deionized water were added to the glass vessel containing 1 part of 1% poly(AMBTAC), with stirring. The resulting mixture had a polymer concentration of 0.5%, a sodium thiocyanate concentration of 2.0%, and an $(NH_4)_2SO_4$ concentration of 5%. The vessel was warmed to produce a clear solution, then allowed to cool. The polymer was observed to precipitate, as evidenced by the appearance of turbidity in the vessel, at a temperature of 44° C. Thus, the cloud point of 0.5% poly (AMBTAC) in 2.0% sodium thiocyanate and 5% $(NH_4)_2SO_4$ was 44° C.

EXAMPLE 6

The procedure of Example 5 was repeated, except that the sodium thiocyanate concentration was 3.0%. In this case, the polymer was observed to precipitate, as evidenced by the appearance of turbidity in the vessel, at a temperature of 70° C. Thus, the cloud point of 0.5% poly(AMBTAC) in 3.0% sodium thiocyanate and 5% $(NH_4)_2SO_4$ was 70° C.

EXAMPLE H

A 40% solution of poly(DMAEA.MeCl), was prepared as follows: 160 parts of a 75% solution of DMAEA.MeCl (the methyl chloride quaternary of dimethylaminoethylacrylate), 140 parts of deionized water and 0.120 part of VA-044 were added to an appropriate vessel. The solution was sparged with nitrogen gas and stirred for about one hour at ambient temperature. The nitrogen sparge was changed to a nitrogen purge, and polymerization was initiated thermally by raising the temperature of the solution to 44° C. Stirring and heating were continued for about 21 hours. The vessel was cooled to give a clear, viscous solution of poly(DMAEA.MeCl) having a standard viscosity of about 2.3 centipoise.

EXAMPLE 7

The temperature dependent solubility behavior of poly (DMAEA.MeCl) prepared as in Example H was determined by measuring the cloud points in a solution containing $(NH_4)_2SO_4$ and sodium thiocyanate as follows: The 40% poly(DMAEA.MeCl) polymer solution was diluted in deionized water to give a 1% solution. One part of the 1% polymer solution was added to a clear glass vessel. 0.10 part sodium thiocyanate, 0.1 part $(NH_4)_2SO_4$, and 0.80 part deionized water were added to the glass vessel containing 1 part of 1% poly(DMAEA.MeCl), with stirring. The resulting mixture had a polymer concentration of 0.5%, a sodium thiocyanate concentration of 5%, and an $(NH_4)_2SO_4$ concentration of 5%. The vessel was warmed to produce a clear solution, then allowed to cool. The polymer was observed to precipitate, as evidenced by the appearance of turbidity in the vessel, at a temperature of 35° C. Thus, the cloud point of 0.5% poly(DMAEA.MeCl) in 5% sodium thiocyanate and 5% $(NH_4)_2SO_4$ was 35° C.

EXAMPLE I

A 40% solution of poly(DMAEM.DMS), was prepared as follows: 160 parts of a 75% solution of DMAEM.DMS (the dimethyl sulfate quaternary salt of dimethylaminoethylmethacrylate), 140 parts of deionized water and 0.120 part of VA-044 were added to an appropriate vessel. The solution was sparged with nitrogen gas and stirred for about one hour at ambient temperature. The nitrogen sparge was changed to a nitrogen purge, and polymerization was initiated thermally by raising the temperature of the solution to 44° C. Stirring and heating were continued for about 18 hours. The vessel was cooled to give a clear, viscous solution of poly(DMAEM.DMS) having a standard viscosity of about 1.3 centipoise.

EXAMPLE 8

The temperature dependent solubility behavior of poly (DMAEM.DMS) prepared as in Example I was determined by measuring the cloud points in a solution containing $(NH_4)_2SO_4$ and sodium thiocyanate as follows: The 40% poly(DMAEM.DMS) polymer solution was diluted in deionized water to give a 1% solution. One part of the 1% polymer solution was added to a clear class vessel. 0.10 part sodium thiocyanate, 0.1 part $(NH_4)_2SO_4$, and 0.80 part deionized water were added to the glass vessel containing 1 part of 1% poly(DMAEM.DMS), with stirring. The resulting mixture had a polymer concentration of 0.5%, a sodium thiocyanate concentration of 5%, and an $(NH_4)_2SO_4$ concentration of 5%. The vessel was warmed to produce a clear solution, then allowed to cool. The polymer was observed to precipitate, as evidenced by the appearance of turbidity in the vessel, at a temperature of 49° C. Thus, the cloud point of 0.5% poly(DMAEM.DMS) in 5% sodium thiocyanate and 5% $(NH_4)_2SO_4$ was 49° C.

EXAMPLE 9

A copolymer containing about 45 mole % DMAEA.MeCl, 42 mole % acrylamide (AMD) and 13 mole % ethyl acrylate (EA) was prepared by polymerizing the monomers in the presence of 15% $(NH_4)_2SO_4$ and 6.75% 1,3-benzenedisulfonate as follows: 16.8 parts of an 80% solution of DMAEA.MeCl, 8.6 parts of a 53% solution of acrylamide, 2.0 parts of ethyl acrylate, 15 parts of $(NH_4)_2SO_4$, and 7.94 parts of 85% 1,3-benzenedisulfonate and 44.66 parts of deionized water were added to a clear glass vessel, with stirring, to form a clear solution. 1.0 parts of a solution comprising 0.004 parts VA-044 per part of solution was added, along with 0.4 parts of a 5% solution of sodium ethylenediaminetetraacetate (EDTA) and 3.6 parts deionized water. EDTA is a chelating agent and was added to prevent inhibition of polymerization by metal ions. The resulting clear solution was nitrogen sparged, with stirring, for 30 minutes. The sparge was changed to a nitrogen purge, and polymerization was initiated by exposing the vessel to an ultraviolet lamp. Exposure to the lamp was continued for 45 minutes. The product was white and contained precipitated polymer with a standard viscosity of about 2.5 centipoise.

EXAMPLE J

A 10% solution of a copolymer containing about 55 mole % DMAEA.MeCl and 45 mole % acrylamide (AMD) was prepared as follows: 4.81 parts of an 80% solution of DMAEM.MeCl, 2.18 parts of a 53% solution of acrylamide (AMD), 0.63 parts of a solution comprising 0.002 part VA-044 per part of solution, 0.1 part of a 5% solution of sodium ethylenediaminetetraacetate (EDTA) and 42.28 parts of deionized water were added to a suitable glass vessel. The solution was sparged with nitrogen gas and stirred for about 15 minutes at ambient temperature. The nitrogen sparge was changed to a nitrogen purge, and polymerization was initiated by exposing the glass vessel to a ultraviolet lamp for about one hour. A clear, viscous 10% solution of poly(55-DMAEA.MeCl/45-AMD) having a standard viscosity of about 1.4 centipoise resulted.

EXAMPLE K

A 10% solution of a copolymer comprising 75 mole % DMAEA.MeCl and 25 mole % acrylamide (AMD) was prepared as follows: 5.57 parts of an 80% solution of DMAEM.MeCl, 1.03 parts of a 53% solution of acylamide (AMD), 0.63 part of a solution comprising 0.002 part VA-044 per part of solution, 0.1 part of a 5% solution of sodium ethylenediaminetetraacetate (EDTA) and 42.67 parts of deionized water were added to a suitable glass vessel. The solution was sparged with nitrogen gas and stirred for about 15 minutes at ambient temperature. The nitrogen sparge was changed to a nitrogen purge, and polymerization was initiated by exposing the glass vessel to an ultraviolet lamp for about one hour. A clear, viscous 10% solution of poly(75-DMAEA.MeCl/25-AMD) having a standard viscosity of about 1.4 centipoise resulted.

EXAMPLE 10

The temperature dependent solubility behavior of poly (55-DMAEA.MeCl/45-AMD) prepared as in Example J was determined by measuring the cloud points in a solution containing $(NH_4)_2SO_4$ and sodium 1,3-benzenedisulfonate as follows: The 10% poly(55-DMAEA.MeCl/45-AMD) polymer solution was diluted in deionized water to give a 1% solution. 0.051 part sodium 1,3-benzenedisulfonate, 0.4 part $(NH_4)_2SO_4$, and 0.549 part deionized water was added to a clear glass vessel containing 1 part of 1% poly(55-DMAEA.MeCl/45-AMD), with stirring. The resulting mixture had a polymer concentration of 0.5%, a sodium 1,3-benzenedisulfonate concentration of 2.55%, and an $(NH_4)_2SO_4$ concentration of 20%. The vessel was warmed to produce a clear solution, then allowed to cool. The polymer was observed to precipitate, as evidenced by the appearance of turbidity in the vessel, at a temperature of 53° C. Thus, the cloud point of 0.5% poly(55-DMAEA.MeCl/45-AMD) in 2.55% sodium 1,3-benzenedisulfonate and 20% $(NH_4)_2SO_4$ was 53° C.

EXAMPLE 11

The temperature dependent solubility behavior of poly (75-DMAEA.MeCl/25-AMD) prepared as in Example K was determined by measuring the cloud points in a solution containing $(NH_4)_2SO_4$ and sodium 1,3-benzenedisulfonate as follows: The 10% poly(75-DMAEA.MeCl/25-AMD) polymer solution was diluted in deionized water to give a 1% solution. 0.051 part sodium 1,3-benzenedisulfonate, 0.4 part $(NH_4)_2SO_4$, and 0.549 part deionized water was added to a clear glass vessel containing 1 part of 1% poly(55-DMAEA.MeCl/45-AMD), with stirring. The resulting mixture had a polymer concentration of 0.5%, a sodium 1,3-benzenedisulfonate concentration of 2.55%, and an $(NH_4)_2SO_4$ concentration of 20%. The vessel was warmed to produce a clear solution, then allowed to cool. The polymer was observed to precipitate, as evidenced by the appearance of turbidity in the vessel, at a temperature of 66° C. Thus, the cloud point of 0.5% poly(75-DMAEA.MeCl/25-AMD in 2.55% sodium 1,3-benzenedisulfonate and 20% $(NH_4)_2SO_4$ was 66° C., as compared to 53° C. for the poly(55-DMAEA.MeCl/45-AMD) of Example 10.

EXAMPLE L

A 40% solution of a copolymer comprising 55 mole % DMAEA.MeCl and 45 mole % acrylamide (AMD) was prepared as follows: 19.23 parts of an 80% solution of DMAEM.MeCl, 8.85 parts of a 52.21% solution of acrylamide (AMD), 2 parts of a solution comprising 0.01 part VA-044 per part of solution, 0.4 part of a 5% solution of sodium ethylenediaminetetraacetate (EDTA), 2.5 parts isopropyl alcohol and 17.03 parts of deionized water were added to a suitable glass vessel. The solution was sparged with nitrogen gas and stirred for about 15 minutes at ambient temperature. The nitrogen sparge was changed to a nitrogen purge, and polymerization was initiated by exposing the glass vessel to a ultraviolet lamp for about one hour. A clear, viscous 40% solution of poly(55-DMAEA.MeCl I 45-AMD) having a standard viscosity of about 1.3 centipoise resulted.

EXAMPLE 12

The temperature dependent solubility behavior of poly (55-DMAEA.MeCl/45-AMD) prepared as in Example L was determined by measuring the cloud points in a solution containing $(NH_4)_2SO_4$ and sodium diisobutylsulfosuccinate as follows: The 40% poly(55-DMAEA.MeCl/45-AMD) polymer solution was diluted in deionized water to give a 1% solution. 0.0404 part sodium di sobutylsulfosuccinate, 0.1 part $(NH_4)_2SO_4$, and 0.8596 part deionized water was added to a clear glass vessel containing 1 part of 1% poly(55-DMAEA.MeCl/45-AMD), with stirring. The resulting mixture had a polymer concentration of 0.5%, a sodium diisobutylsulfosuccinate concentration of 2.02%, and an $(NH_4)_2SO_4$ concentration of 5%. The vessel was warmed to produce a clear solution, then allowed to cool. The polymer was observed to precipitate, as evidenced by the appearance of turbidity in the vessel, at a temperature of 55° C. Thus, the cloud point of 0.5% poly(55-DMAEA.MeCl/45-AMD in 2.02% sodium diisobutylsulfosuccinate and 5% (NH$_4$)$_2$SO$_4$ was 55° C.

EXAMPLE 13

The temperature dependent solubility behavior of poly (55-DMAEA.MeCl/45-AMD) prepared as in Example L was determined by measuring the cloud points in a solution containing (NH$_4$)$_2$SO$_4$ and sodium diisobutylsulfosuccinate as follows: The 40% poly(55-DMAEA.MeCl/45-AMD) polymer solution was diluted in deionized water to give a 1% solution. 0.0132 parts sodium diisobutylsulfosuccinate, 0.3 part (NH$_4$)$_2$SO$_4$, and 0.6868 part deionized water was added to a clear glass vessel containing 1 part of 1% poly(55-DMAEA.MeCl/45-AMD), with stirring. The resulting mixture had a polymer concentration of 0.5%, a sodium diisobutylsulfosuccinate concentration of 0.66%, and an (NH$_4$)$_2$SO$_4$ concentration of 15%. The vessel was warmed to produce a clear solution, then allowed to cool. The polymer was observed to precipitate, as evidenced by the appearance of turbidity in the vessel, at a temperature of 50° C. Thus, the cloud point of 0.5% poly(55-DMAEA.MeCl/45-AMD in 0.66% sodium diisobutylsulfosuccinate and 15% (NH$_4$)$_2$SO$_4$ was 50° C.

EXAMPLE 14

A dispersion of a polymer containing 55 mole % DMAEA.MeCl and 45 mole % AMD was prepared as follows: 19.3 parts 80% DMAEA.MeCl, 8.6 parts 53% AMD, 15 parts ammonium sulfate, 8.44 parts technical (800/)) solid 1,3-benzenedisulfonate, 1 part of a solution containing 0.004 part VA-044 per part of solution, 0.4 part of a 5% solution of sodium ethylenediaminetetraacel:ate (EDTA), and 47.26 parts deionized water were added to a suitable clear glass vessel and stirred to form a clear solution. The solution was sparged with nitrogen gas and stirred for about 15 minutes at ambient temperature. The nitrogen sparge was changed to a nitrogen purge, and polymerization was initiated by exposing the glass vessel to a ultraviolet lamp for about one hour. The product was a white dispersion that displayed a yield stress, with a standard viscosity of about 2.2 centipoise.

EXAMPLE M

A 20% solution of a nonionic dispersant containing 98 mole % AMD and 2 mole % t-butyl acrylamide was prepared as follows: 36.42 parts 53% AMD, 0.7 parts t-butyl acrylamide, 3 parts isopropanol, 1 part of a solution containing 0.004 parts VA-044 per part of solution, 0.4 part of a 5% solution of sodium ethylenediaminetetraacetate (EDTA), and 58.48 parts deionized water were added to a suitable clear glass vessel and stirred to form a clear solution. The solution was sparged with nitrogen gas and stirred for about 15 minutes at ambient temperature. The nitrogen sparge was changed to a nitrogen purge, and polymerization was initiated by exposing the glass vessel to a ultraviolet lamp for about one hour. The product was a clear, viscous polymer solution, with a standard viscosity of about 1.4 centipoise.

EXAMPLE 15

A dispersion of a polymer containing 55 mole % DMAEA.MeCl, 43 mole % AMD and 2 mole % t-butyl acrylamide was prepared in the presence of a dispersant prepared as in Example M as follows: 5 parts of a 20% polymer solution prepared as in Example M, 19.08 parts 80% DMAEA.MeCl, 8.26 parts 53% AMD, 0.36 part t-butyl acrylamide, and 42.9 parts deionized water were added to a suitable glass vessel and stirred to dissolve the polymer. 15 Parts ammonium sulfate, 7.94 parts technical (85%) solid sodium 1,3-benzenedisulfonate, 1 part of a solution containing 0.004 part VA-044 per part of solution, and 0.4 parts of a 5% solution of sodium ethylenediaminetetraacetate (EDTA) were added and stirred. The mixture was sparged with nitrogen gas and stirred for about 15 minutes at ambient temperature. The nitrogen sparge was changed to a nitrogen purge, and polymerization was initiated by exposing the glass vessel to a ultraviolet lamp for about one hour. The product was a white dispersion that displayed a yield stress, with a standard viscosity of about 2.3 centipoise.

EXAMPLE N

A 20% solution of a nonionic polyacrylamide dispersant was prepared as follows: 37.24 parts 53% AMD, 3 parts isopropanol, 1 part of a solution containing 0.004 parts VA-044 per part of solution, 0.4 part of a 5% solution of sodium ethylenediaminetetraacetate (EDTA), and 58.36 parts deionized water were added to a suitable clear glass vessel and stirred to form a clear solution. The solution was sparged with nitrogen gas and stirred for about 15 minutes at ambient temperature. The nitrogen sparge was changed to a nitrogen purge. and polymerization was initiated by exposing the glass vessel to a ultraviolet lamp for about one hour. The product was a clear, viscous polymer solution, with a standard viscosity of about 1.4 centipoise.

EXAMPLE 16

A dispersion of a polymer containing 55 mole % DMAEA.MeCl and 45 mole % AMD was prepared in the presence of a dispersant prepared as in Example N as follows: 6 parts of a 20% polymer dispersant solution prepared as in Example N, 9.61 parts 80% DMAEA.MeCl, 2.31 parts 53% AMD, and 57.94 parts deionized water were added to a suitable glass vessel and stirred to dissolve the polymer. 15 parts ammonium sulfate, 7.94 parts technical (85%) solid sodium 1,3-benzenedisulfonate, 1 part of a solution containing 0.002 part VA-044 per part of solution, and 0.2 part of a 5% solution of sodium ethylenediaminetetraacetate (EDTA) were added and stirred. The mixture was sparged with nitrogen gas and stirred for about 15 minutes at ambient temperature. The nitrogen sparge was changed to a nitrogen purge, and polymerization was initiated by exposing the glass vessel to a ultraviolet lamp for about one hour. The product was a white dispersion that displayed a yield stress.

Example 17 (Comparison)

This experiment was conducted exactly as in Example 16, except that 6 parts deionized water was used instead of 6 parts dispersant. Both dispersions were initially stirrable, but the dispersion without the dispersant settled within a few hours, whereas the dispersion which contained the dispersant was still stirrable after 24 hours.

EXAMPLE O

A 20% solution of an anionic dispersant containing 99 mole % acrylamide and 1 mole % of sodium acrylamidomethylpropane sulfonate was prepared as follows: 18.54 parts 52.2% AMD, 0.63 part 50% sodium 2-acrylamido-2-methylpropane sulfonate, 1.5 parts isopropanol, 1.25 parts of a solution containing 0.002 part VA-044 per part of solution, 0.2 part of a 5% solution of sodium ethylenediaminetetraacetate (EDTA), and 27.88 parts deionized water were added to a suitable clear glass vessel and stirred to form a clear solution. The solution was sparged with nitrogen gas and stirred for about 15 minutes at ambient temperature. The nitrogen sparge was changed to a nitrogen purge, and polymerization was initiated by exposing the glass vessel to a ultraviolet lamp for about one hour. The product was a clear, viscous polymer solution, with a standard viscosity of about 1.5 centipoise.

EXAMPLE 18

A dispersion of a polymer containing 55 mole % DMAEA.MeCl and 45 mole % AMD was prepared in the presence of a dispersant prepared as in Example 0 as follows: 6 parts of a 20% polymer dispersant solution prepared as in Example 0, 15 parts ammonium sulfate, 7.91 parts technical (85%) solid sodium 1,3-benzenedisulfonate, 0.2 part of a 5% solution of sodium ethylenediaminetetraacetate (EDTA), and 45.89 parts deionized water were added to a first glass vessel and stirred to dissolve the polymer, forming a salt solution. 9.61 parts 80% DMAEA.MeCl, 4.42 parts 52.2% AMD, 1.25 parts of a solution containing 0.002 part VA-044 per part of solution, and 9.72 parts deionized water were added to a second vessel, forming a monomer solution. Both the monomer solution and the salt solution were sparged with nitrogen about 15 minutes at ambient temperature. The monomer solution was added dropwise to the salt solution at a rate of about 0.4 part per minute, during which the salt solution was stirred under a nitrogen purge and exposed to an ultraviolet lamp. After the addition was complete, the resulting white dispersion was stirred for an additional hour. The product was a white dispersion that was still stirrable after a day.

EXAMPLE P

A 20% solution of a cationic dispersant containing 90 mole % acrylamide and 10 mole % DEAEA.MeCl was prepared as follows: 14.22 parts 52.2% AMD, 2.57 parts DEAEA.MeCl, 1.5 parts isopropanol, 1.25 parts of a solution containing 0.002 part VA-044 per part of solution, 0.2 part of a 5% solution of sodium ethylenediaminetetraacetate (EDTA), and 30.25 parts deionized water were added to a suitable clear glass vessel and stirred to form a clear solution. The solution was sparged with nitrogen gas and stirred for about 15 minutes at ambient temperature. The nitrogen sparge was changed to a nitrogen purge, and polymerization was initiated by exposing the glass vessel to a ultraviolet lamp for about one hour. The product was a clear, viscous polymer solution, with a standard viscosity of about 1.4 centipoise.

EXAMPLE 19

A dispersion of a polymer containing 55 mole % DEAEA.MeCl and 45 mole % AMD was prepared in the presence of a dispersant prepared as in Example P as follows: 6 parts of a 20% polymer dispersant solution prepared as in Example P, 10 parts ammonium sulfate, 7.12 parts technical (85%) solid sodium 1,3-benzenedisulfonate, 0.2 part of a 5% solution of sodium ethylenediaminetetraacetate (EDTA), and 51.68 parts deionized water were added to a first glass vessel and stirred to dissolve the polymer, forming a salt solution. 7.92 parts DEAEA.MeCl, 3.98 parts 52.2% AMD, 1.25 parts of a solution containing 0.002 part VA-044 per part of solution, and 11.85 parts deionized water were added to a second vessel, forming a monomer solution. Both the monomer solution and the salt solution were sparged with nitrogen for about 15 minutes at ambient temperature. The monomer solution was added dropwise to the salt solution at a rate of about 0.4 part per minute, during which the salt solution was stirred under a nitrogen purge and exposed to an ultraviolet lamp. After the addition was complete, the resulting white dispersion was stirred for an additional hour. The product was a white dispersion that was still stirrable after a day.

EXAMPLE Q

A 20% solution of a copolymer containing about 55 mole % DMAEA.MeCl and 45 mole % acrylamide (AMD) was prepared as follows: 9.62 parts of an 80% solution of DMAEM.MeCl, 4.36 parts of a 53% solution of acrylamide (AMD), 1 part of a solution having 0.01 part VA-044 per part of solution, 0.2 part of a 5% solution of sodium ethylenediaminetetraacetate (EDTA) and 34.82 parts of deionized water were added to a suitable glass vessel. The solution was sparged with nitrogen gas and stirred for about 15 minutes at ambient temperature. The nitrogen sparge was changed to a nitrogen purge, and polymerization was initiated by exposing the glass vessel to a ultraviolet lamp for about one hour. A clear, viscous 20% solution of poly(55-DMAEA.MeCl/45-AMD) having a standard viscosity of about 3.1 centipoise resulted.

EXAMPLE R

A 0.2% solution of poly(55-DMAEA.MeCl/45-AMD) was prepared by stirring 4.1 parts of a poly(55-DMAEA.MeCl/45-AMD) solution prepared as in Example Q in 16.4 parts of water to form a clear 4% solution, then adding 389.5 parts deionized water and stirring.

EXAMPLE 20

A 4% solution of poly(55-DMAEA.MeCl/45-AMD) was prepared by stirring 4.1 parts of a poly(55-DMAEA.MeCl/45-AMD) solution prepared as in Example Q in 16.4 parts of water. This solution was mixed with 20.5 parts of a solution containing 2.05 parts ammonium sulfate and 2.46 parts sodium benzenesulfonate to give a composition containing precipitated polymer and aqueous salt. This composition, which was 2% polymer, 5% ammonium sulfate and 6% sodium benzenesulfonate, was then diluted by stirring with 369 parts water to form a 0.2% solution of poly(55-DMAEA.MeCl/45-AMD).

EXAMPLES 21 & 22

The performance of the polymers prepared in Examples R and 20 was evaluated by measuring their ability to flocculate suspended solids in a biologically treated suspension (sludge). The solids level in the sludge was 1.88%. The evaluation procedure was performed as follows: 15 parts of the 0.2% polymer solution from Example R was vigorously mixed with 200 parts of the sludge for 5 seconds, then filtered. The number of parts of filtrate which drained freely through the filter in 10 seconds was measured and recorded (10 second free drainage). The procedure was repeated using 17,19,21 and 23 parts of 0.2% polymer solution, then repeated in an identical fashion for the 0.2% polymer solution from Example 20. The 10 second free drainage for both polymers is shown in Table 11 and (plotted in FIG. 11) as a function of the polymer dose, where the dose is expressed in units of pounds of polymer per dry ton of sludge (lbs./DT). Table 11 (FIG. 11) shows that the flocculation performance of the precipitated polymer (Example 20) is comparable to the flocculation performance of the solution polymer (Example R) at lower dosages, but superior at higher dosages.

TABLE 11

10 Second Free Drainage of Flocculated Solids as a Function of Polymer Dose for Precipitated and Solution Polymers

| Polymer dose, lbs./DT | Free Drainage Example 20 (precipitated) | Free Drainage Example R (Solution) |
|---|---|---|
| 16 | 94 | 100 |
| 18.1 | 132 | 137 |
| 20.2 | 146 | 140 |
| 22.3 | 150 | 136 |
| 24.5 | 154 | 138 |

A 2% solution of a copolymer containing about 20 mole % DMAEA.MeCl, 20 mole % DMAEM.BzCl, and 60 mole % acrylamide (AMD) was prepared as follows: 1.43 parts of an 80% aqueous solution of DMAEA.MeCl, 2.36 parts of a 53.45% aqueous solution of acrylamide, 1.99 parts of an 80% aqueous solution of DMAEM.BzCl, 0.8 part of a solution having 0.005 part VA-044 per part of solution, 0.4 part of a 1% solution of sodium ethylenediaminetetraacetate (EDTA) and 193.02 parts of deionized water were added to a suitable glass vessel. The solution was sparged with nitrogen gas for about 15 minutes at ambient temperature. The nitrogen sparge was changed to a nitrogen purge, and polymerization was initiated by exposing the glass vessel to a ultraviolet lamp for about 1.5 hours. A clear 2% solution of poly(20-DMAEA.MeCl/20-DMAEM.BzCl/60-AMD) having a standard viscosity of about 1.25 centipoise resulted.

EXAMPLES 23–41

The solubility behavior of 1% poly(20-DMAEA.MeCl/20-DMAEM.BzCl/60-AMD) terpolymer was determined as follows: 19 samples were prepared as shown in Table 12 by mixing 2% poly(20-DMAEA.MeCl/20-DMAEA.BzCl/60-AMD), prepared as in Example S, with various amounts of sodium thiocyanate and ammonium sulfate. After mixing, the concentration of poly(20-DMAEA.MeCl/20-DMAEA.BzCl/60-AMD) was 1%, and the concentrations of sodium thiocyanate and ammonium sulfate in each sample are shown in Table 12. For each sample, the solubility behavior of the polymer (either soluble or precipitated) was visually determined at ambient temperature.

TABLE 12

Solubility of 1% poly(20-DMAEA.MeCl/20-DMAEA.BzCl/60-AMD) as a function of ammonium sulfate and sodium thiocyanate concentration

| Sample No. | % NaSCN | % $(NH_4)_2SO_4$ | Solubility Behavior |
|---|---|---|---|
| 23C | 0 | 10.0 | Soluble |
| 24C | 0 | 13.5 | Soluble |
| 25C | 0 | 17.0 | Soluble |
| 26C | 0 | 20.5 | Soluble |
| 27C | 0 | 25.0 | Soluble |
| 28C | 0 | 30 | Precipitated |
| 29C | 0.25 | 10 | Soluble |
| 30C | 0.25 | 13.5 | Soluble |
| 31C | 0.25 | 17 | Soluble |
| 32 | 0.25 | 20.5 | Precipitated |
| 33 | 0.25 | 25 | Precipitated |
| 34C | 0.50 | 10 | Soluble |
| 35 | 0.5 | 13.5 | Precipitated |
| 36 | 0.50 | 17 | Precipitated |

TABLE 12-continued

Solubility of 1% poly(20-DMAEA.MeCl/20-DMAEA.BzCl/60-AMD) as a function of ammonium sulfate and sodium thiocyanate concentration

| Sample No. | % NaSCN | % $(NH_4)_2SO_4$ | Solubility Behavior |
|---|---|---|---|
| 37 | 0.50 | 20.5 | Precipitated |
| 38 | 0.75 | 10 | Precipitated |
| 39 | 0.75 | 13.5 | Precipitated |
| 40 | 0.75 | 17 | Precipitated |
| 41 | 0.75 | 20.5 | Precipitated |

C = Comparative

EXAMPLE 42

29.06 Parts of an aqueous 52.21% acrylamide solution, 11.83 parts of DMAEA.MeCl, 13.5 parts of 20% dispersant prepared as in Example P, 13.5 parts of a 10% aqueous solution of a commercially available poly(vinylpyrrolidone-co-vinylacetate)(having a molecular weight reported to be about 100,000), 14.4 parts of a 45% aqueous solution of DIBSS (obtained commercially from Cytec Industries Inc. under the tradename IB-45®), 5.1 parts of a 1% solution of sodium ethylenediaminetetraacetate (EDTA), 65.7 parts distilled water and 40.5 parts ammonium sulfate were added to a suitable vessel. The pH of the mixture was adjusted to 3.5 and the mixture was sparged with nitrogen for 15 minutes. The mixture was heated to 44° C. in a heating bath and 0.9 parts of a 3.67% AIBN (2,2'-azobis 2-methyl-propionitrile) solution was added. The temperature of the reaction mixture rose to 55° C. over the course of an hour, then cooled to 45° C. over the course of an hour, then stayed at this temperature for 2 hours as the bath temperature was held at 53° C. The reaction mixture was filtered to remove the resultant grainy polymer precipitate. The polymer was dried in a forced air oven at 105° C. for three hours to yield substantially dry, free flowing polymer granules. The standard viscosity of the polymer granules was 1.8 centipoise.

EXAMPLE 43

Figure 1:
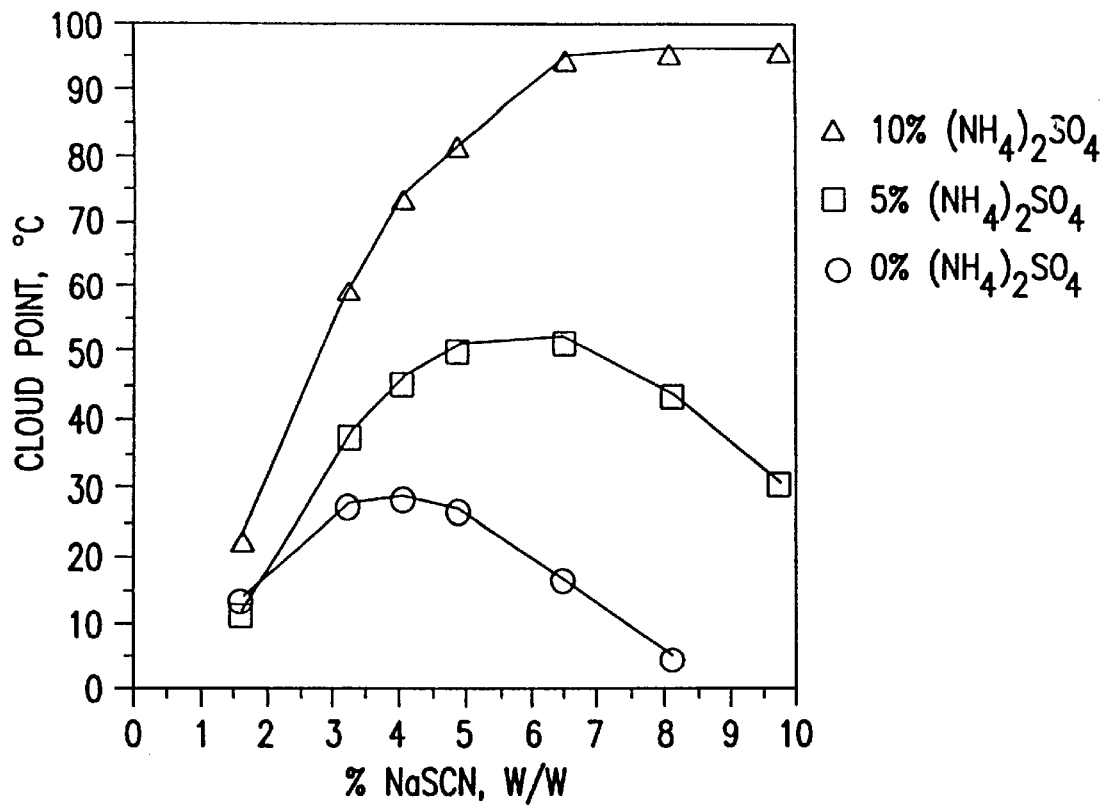
FIG. 1 is a plot of the cloud points of 0.5 wt % poly (DMAEM.MeCl) as a function of wt % NaSCN and wt % $(NH_4)_2SO_4$.

The cloud points of 0.5% poly(DMAEA.MeCl) as a function of wt. % NaSCN and wt. % $(NH_4)_2SO_4$ were determined by preparing a series of samples which all contained 1.0 part of a 1% solution of poly(DMAEM.MeCl) (prepared as in Example A, then diluted with deionized water), and various amounts of NaSCN, $(NH_4)_2SO_4$, and water such that the final concentration of poly (DMAEM.MeCl) was 0.5% in each sample and so that the final concentrations of the salts in each sample were as shown in Table 1 (FIG. 1). The cloud points were determined by heating and stirring each sample to form a clear solution, then cooling until the solution became cloudy. The cloud point is the temperature at which cloudiness was observed. The resulting cloud points of 0.5% poly(DMAEM.MeCl) as a function of wt. % NaSCN and wt. % $(NH_4)_2SO_4$ are given in Table 1 (FIG. 1).

EXAMPLE 44

The cloud points of 5% poly(DMAEM.MeCl) as a function of wt. % NaSCN and type of kosmotropic salt were determined by preparing a series of samples which all contained 1.0 part of a 10% solution of poly (DMAEM.MeCl) (prepared as in Example A, then diluted with deionized water), and various amounts of NaSCN, water, and either $(NH_4)_2SO_4$, $Na_2SO_4$, or $Al_2(SO_4)_3 \cdot 18H_2O$, such that the final concentration of poly(DMAEM.MeCl)

was 5% in each sample and so that the final concentrations of the salts in each sample were as shown in Table 2 (FIG. 2). The cloud points were determined by heating and stirring each sample to form a clear solution, then cooling until the solution became cloudy. The cloud point is the temperature at which cloudiness was observed. The resulting cloud points of 5% poly(DMAEM.MeCl) as a function of wt. % NaSCN and type of kosmotropic salt are given in Table 2 (FIG. 2).

EXAMPLE 45

The cloud points of 0.5% poly(DMAEM.MeCl) as a function of wt. % chaotropic salt in 20% $(NH_4)_2SO_4$ were determined by preparing a series of samples which all contained 1.0 part of a 1% solution of poly(DMAEM.MeCl) (prepared as in Example A, then diluted with deionized water), 0.4 part $(NH_4)_2SO_4$, and various amounts of chaotropic salts (and anionic organic salts, in the case of sodium benzenesulfonate) such that the final concentration of poly (DMAEM.MeCl) was 0.5% in each sample, the final concentration of $(NH_4)_2SO_4$ was 20%, and so that the final concentrations of the chaotropic salts in each sample were as shown in Table 3 (FIG. 3). The cloud points were determined by heating and stirring each sample to form a clear solution, then cooling until the solution became cloudy. The cloud point is the temperature at which cloudiness was observed. The resulting cloud points of 0.5% poly(DMAEM.MeCl) as a function of wt. % chaotropic salt in 20% $(NH_4)_2SO_4$ are given in Table 3 (FIG. 3).

EXAMPLE T

A 20% solution of poly(DMAEM.BzCl) was prepared as follows: 80 parts of a 75% solution of DMAEM.BzCl, 220 parts of deionized water and 0.060 parts of 2,2'-azobis[2-(2-imidazdin-2-yl) propane] dihydrochloride, hereinbelow VA-044, an azo initiator, were added to an appropriate vessel. The solution was sparged with nitrogen gas and stirred for about one hour at ambient temperature. The nitrogen sparge was changed to a nitrogen purge, and polymerization was initiated thermally by raising the temperature of the solution to 44° C. Stirring and heating were continued for about 21 hours. The vessel was cooled to give a clear, viscous solution of poly(DMAEM.BzCl) having a standard viscosity of about 1.3 centipoise.

EXAMPLE U

A 20% solution of poly(MAPTAC) was prepared as follows: 80 parts of a 75% solution of acrylamidopropyltrimethylammonium chloride (MAPTAC), 220 parts of deionized water and 0.060 parts of 2,2'-azobis[2-(2-imidazdin-2-yl) propane] dihydrochloride, hereinbelow VA-044, an azo initiator, were added to an appropriate vessel. The solution was sparged with nitrogen gas and stirred for about one hour at ambient temperature. The nitrogen sparge was changed to a nitrogen purge, and polymerization was initiated thermally by raising the temperature of the solution to 44° C. Stirring and heating were continued for about 21 hours. The vessel was cooled to give a clear, viscous solution of poly(MAPTAC) having a standard viscosity of about 1.5 centipoise.

EXAMPLE V

A 20% solution of poly(DEAEM.MeCl) was prepared as follows: 80 parts of a 75% solution of methacryloxyethyldiethylmethylammonium chloride (DEAEM.MeCl), 220 parts of deionized water and 0.015 parts of VA-044 were added to a suitable glass vessel. The solution was sparged with nitrogen gas and the solution was stirred for about one hour at ambient temperature. The nitrogen sparge was changed to a nitrogen purge, and polymerization was initiated by exposing the glass vessel to a ultraviolet lamp. Stirring and heating were continued for about 3 hours to give a clear, viscous solution of poly(DEAEM.MeCl) having a standard viscosity of about 1.4 centipoise.

EXAMPLE 46

The cloud points of 0.5% cationic polymers as a function of wt. % NaSCN in 5% $(NH_4)_2SO_4$ were determined by preparing a series of samples which contained either 1.0 part of a 1% solution of poly(DMAEM.BzCl) (prepared as in Example T, then diluted with deionized water), 1.0 part of a 1% solution of poly(DEAEM.MeCl) (prepared as in Example V, then diluted with deionized water), 1.0 part of a 1% solution of poly(AMBTAC) (prepared as in Example G, then diluted with deionized water), 1.0 part of a 1% solution of poly(DMAEM.MeCl) (prepared as in Example A, then diluted with deionized water), 1.0 part of a 1% solution of poly(DMAEA.MeCl) (prepared as in Example H, then diluted with deionized water), or 1.0 part of a 1% solution of poly(MAPTAC) (prepared as in Example U, then diluted with deionized water), 0.1 part $(NH_4)_2SO_4$, water, and various amounts of NaSCN such that the final concentration of cationic polymer was 0.5% in each sample, the final concentration of $(NH_4)_2SO_4$ was 5% in each sample, and so that the final concentrations of NaSCN in each sample were as shown in Table 4 (FIG. 4). The cloud points were determined by heating and stirring each sample to form a clear solution, then cooling until the solution became cloudy. The cloud point is the temperature at which cloudiness was observed. The resulting cloud points of 0.5% cationic polymers as a function of wt. % NaSCN in 5% $(NH_4)_2SO_4$ are shown in Table 4 (FIG. 4).

EXAMPLE W

A 10% solution of poly(AMD/DMAEA.MeCl/EA) was prepared as follows: 13.87 parts of 53.58% aqueous acrylamide (AMD), 25.31 parts of a 80% aqueous solution of ethacryloxyethyltrimethylammonium chloride (DMAEA.NeCl), 2.33 parts of ethyl acrylate (EA), 0.3 part EDTA, 258.16 parts of deionized water and 0.030 parts of VA-044 were added to a suitable glass vessel. The solution was sparged with nitrogen gas and stirred for about one hour at ambient temperature. The nitrogen sparge was changed to a nitrogen purge, and polymerization was initiated thermally by raising the temperature of the solution to 44° C. Stirring and heating were continued for about 21 hours to give a clear, viscous solution of poly(AMD/DMAEA.MeCl/EA) having a standard viscosity of about 2.0 centipoise.

EXAMPLE 47

Figure 5:
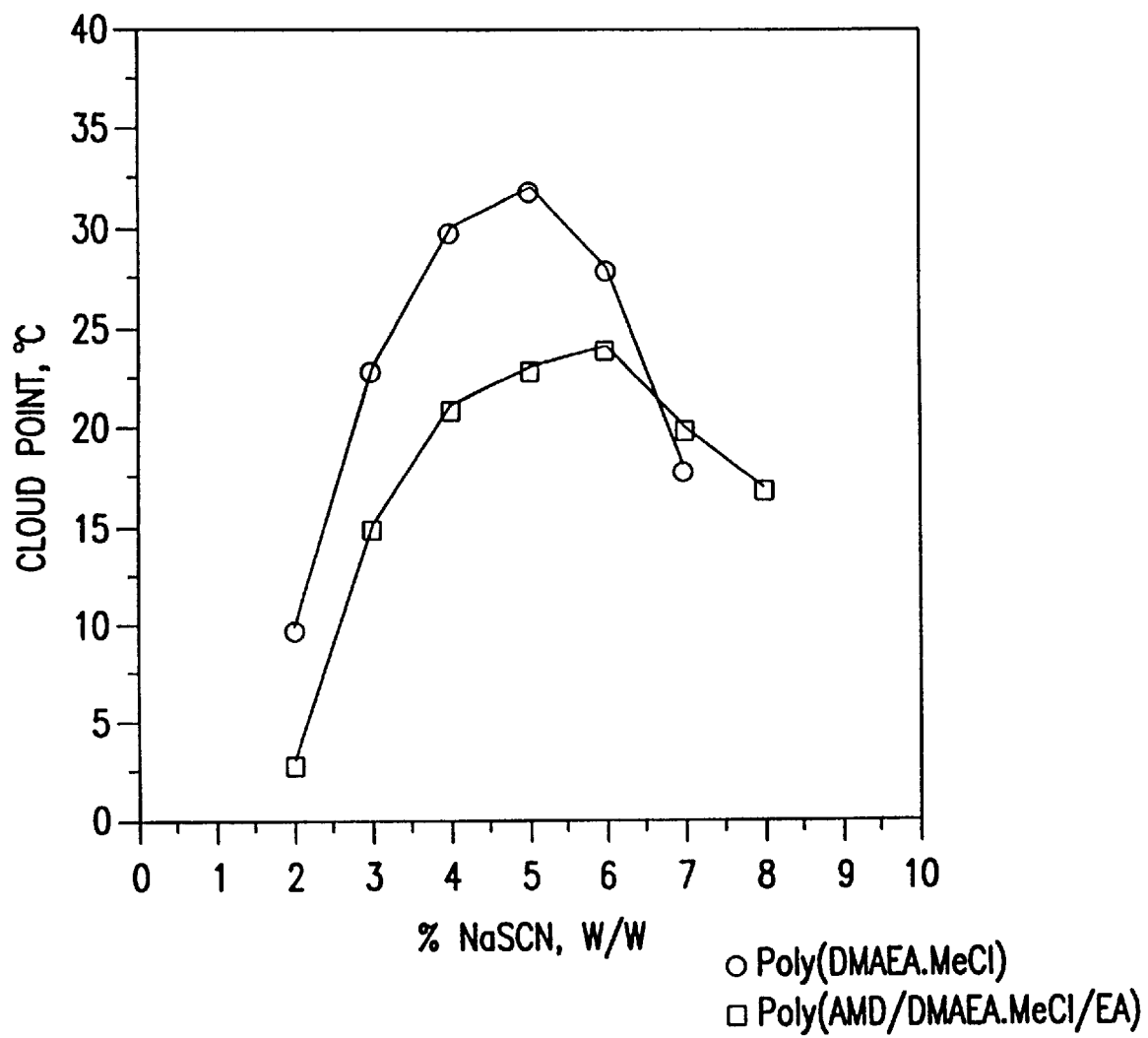
FIG. 5 is a plot of the cloud points of 0.5 wt % poly (DMAEM.MeCl) and 0.5 wt % poly(acrylamide/ DMAEM.MeCl/ethyl acrylate) (45/41/10 mole percent) as a function of NaSCN concentration in 5 wt % $(NH_4)_2SO_4$.

The cloud points of 0.5% poly(DMAEA.MeCl) and 0.5% poly(AMD/DMAEA.MeCl/EA) (45/45/10 mole %) as a function of wt. % NaSCN in 5% $(NH_4)_2SO_4$ were determined by preparing a series of samples which all contained either 1.0 part of a 1% solution of poly(DMAEA.MeCl) (prepared as in Example H, then diluted with deionized water), or 1.0 part of a 1% solution of poly(AMD/ DMAEA.MeCl/EA) (45/45/10 mole %) (prepared as in Example W, then diluted with deionized water), water, 0.1 part $(NH_4)_2SO_4$, and various amounts of NaSCN such that the final concentration of polymer was 0.5% in each sample, the final concentration of (NH$_4$)$_2$SO$_4$ was 5% in each sample, and so that the final concentrations of NaSCN in each sample were as shown in Table 5 (FIG. 5). The cloud points were determined by heating and stirring each sample to form a clear solution, then cooling until the solution became cloudy. The cloud point is the temperature at which cloudiness was observed. The resulting cloud points of 0.5% poly(DMAEA.MeCl) and 0.5% poly(AMD/DMAEA.MeCl/EA) (45/45/10 mole %) as a function of wt. % NaSCN in 5% (NH$_4$)$_2$SO$_4$ are shown in Table 5 (FIG. 5).

EXAMPLE 48

The cloud points of 0.5%, 5%, 15% and 20% poly(DMAEM.MeCl) and poly(DMAEM.DMS) as a function of wt. % NaSCN in 5% (NH$_4$)$_2$SO$_4$ were determined by preparing a series of samples which all contained either 1.0 part of a 1%, 10%, 30% or 40% solution of poly(DMAEM.MeCl) (prepared as in Example A, then diluted with deionized water), or 1.0 part of a 1%, 10%, 30% or 40% solution of poly(DMAE.DMS) (prepared as in Example I, then diluted with deionized water), 0.1 part (NH$_4$)$_2$SO$_4$, and various amounts of NaSCN and water such that the final concentration of (NH$_4$)$_2$SO$_4$ was 5% in each sample, and so that the final concentrations of NaSCN and polymer in each sample were as shown in Table 6 (FIG. 6). The cloud points were determined by heating and stirring each sample to form a clear solution, then cooling until the solution became cloudy. The cloud point is the temperature at which cloudiness was observed. The resulting cloud points of 0.5%, 5%, 15% and 20% poly(DMAEM.MeCl) and poly(DMAEM.DMS) as a function of wt. % NaSCN in 5% (NH$_4$)$_2$SO$_4$ are shown in Table 6 (FIG. 6).

EXAMPLE 49

The cloud points of 0.5% poly(DMAEM.MeCl) in 20% (NH$_4$)$_2$SO$_4$ and 4% NaI/NaBr mixture as a function of the weight fraction of NaI in a NaI/NaBr mixture were determined by preparing a series of samples which all contained 1.0 part of a 1% solution of poly(DMAEM.MeCl) (prepared as in Example A, then diluted with deionized water), 0.4 part (NH$_4$)$_2$SO$_4$, and various amounts of NaI, NaBr, and water such that the final concentration of poly(DMAEM.MeCl) was 0.5% in each sample, the final concentration of (NH$_4$)$_2$SO$_4$ was 20%, the final concentration of NaI and NaBr in each sample was a total of 4%, and the weight fractions of NaI in the NaI/NaBr mixture were as shown in Table 7 (FIG. 7) The cloud points were determined by heating and stirring each sample to form a clear solution, then cooling until the solution became cloudy. The cloud point is the temperature at which cloudiness was observed. The resulting cloud points of 0.5% poly(DMAEM.MeCl) in 20% (NH$_4$)$_2$SO$_4$ and 4% NaI/NaBr mixture as a function of the weight fraction of NaI in the NaI/NaBr mixture are shown in Table 7 (FIG. 7).

EXAMPLE 50

The cloud points of 0.5% poly(DMAEM.MeCl) as a function of wt. % anionic organic salt and wt. % (NH$_4$)$_2$SO$_4$ were determined by preparing a series of samples which all contained 1.0 part of a 1% solution of poly(DMAEM.MeCl) (prepared as in Example A, then diluted with deionized water), and various amounts of anionic organic salt, water, and either no (NH$_4$)$_2$SO$_4$, or 0.4 part (NH$_4$)$_2$SO$_4$ such that the final concentration of poly(DMAEM.MeCl) was 0.5% in each sample and so that the final concentrations of anionic organic salts in each sample were as shown in Table 8 and FIG. 8 (no ammonium sulfate) and Table 9 and FIG. 9 (20% ammonium sulfate). The cloud points were determined by heating and stirring each sample to form a clear solution, then cooling until the solution became cloudy. The cloud point is the temperature at which cloudiness was observed. The resulting cloud points of 0.5% poly(DMAEM.MeCl) as a function of wt. % anionic organic salt and wt. % (NH$_4$)$_2$SO$_4$ are given in Tables 8 and 9 (FIGS. 8 and 9, respectively). In this Example, all of the anionic organic salts are anionic hydrotropic salts.

EXAMPLE 51

The cloud points of 0.5% poly(DMAEA.MeCl/AMD) (55/45 mole %) as a function of wt. % DIBSS and wt. % (NH$_4$)$_2$SO$_4$ were determined by preparing a series of samples which all contained 1.0 part of a 1% solution of poly(DMAEA.MeCl/AMD) (prepared as in Example Q, then diluted with deionized water), either 0.1 or 0.3 part (NH$_4$)$_2$SO$_4$, and various amounts of DiBSS and water such that the final concentration of poly(DMAEA.MeCl/AMD) was 0.5% in each sample and so that the final concentrations of the salts in each sample were as shown in Table 10 (FIG. 10). The cloud points were determined by heating and stirring each sample to form a clear solution, then cooling until the solution became cloudy. The cloud point is the temperature at which cloudiness was observed. The resulting cloud points of 0.5% poly(DMAEA.MeCl/AMD) (55/45 mole %) as a function of wt. % DIBSS and wt. % (NH$_4$)$_2$SO$_4$ are shown in Table 10 (FIG. 10).

We claim:

1. A process comprising mixing, in any order, water, at least one cationic water-soluble polymer, at least one kosmotropic salt, and at least one anionic organic salt, wherein said kosmotropic salt and said anionic organic salt are present in amounts effective to precipitate said cationic water-soluble polymer, to form an aqueous composition comprising the resultant at least one precipitated cationic water-soluble polymer.

2. A process as claimed in claim 1 wherein said anionic organic salt is selected from the group consisting of trichloroacetates, trifluoroacetates, alkyl sulfonates having from 1 to 22 carbon atoms, aryl sulfonates having from 6 to 22 carbon atoms, alkyl sulfates having from 1 to 22 carbon atoms, and aryl sulfates having from 6 to 22 carbon atoms.

3. A process as claimed in claim 1 wherein said precipitated cationic water-soluble polymer contains recurring units having the formula

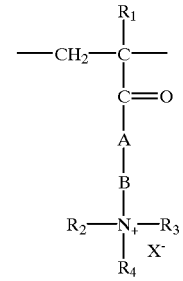

where R$_1$ is either hydrogen or CH$_3$, A is either an oxygen atom or NH, B is an alkylene or oxyalkylene group having 1 to 5 carbons, R$_2$ and R$_3$ are each an alkyl group having from 1 to 3 carbons, R$_4$ is either an alkyl group having from 1 to 10 carbons, or an aryl group having from 6 to 10 carbons, and X is an anionic counterion.

4. A process as claimed in claim 3, wherein said precipitated cationic water-soluble polymer further contains recurring (meth)acrylamide units.

5. A process as claimed in claim 1 wherein some or all of said precipitated cationic water-soluble polymer is precipitated as a polymer dispersion.

6. A process as claimed in claim 1 which comprises further mixing in a water-soluble polymer different from said precipitated cationic water-soluble polymer.

7. A process as claimed in claim 1 wherein said aqueous composition contains water in an amount of 0.1% to 20%, by weight, based on total weight.

8. A process comprising mixing, in any order, a cationic water-soluble polymer comprised of recurring units of a quaternary salt of a dialkylaminoalkyl(alk)acrylate, from 0.5% to 35%, by weight based on total weight, of a sulfonate salt, and from 1% to 27%, by weight based on total weight, of a sulfate salt, wherein said sulfonate salt and said sulfate salt are present in amounts effective to precipitate said cationic water-soluble polymer, to form an aqueous composition comprising the resultant precipitated cationic water-soluble polymer.

9. A process comprising polymerizing at least one cationic monomer to form a cationic water-soluble polymer in an aqueous solution comprised of at least one anionic organic salt and at least one kosmotropic salt, wherein said anionic organic salt and said kosmotropic salt are present in amounts effective to precipitate said cationic water-soluble polymer, to form an aqueous composition comprising the resultant precipitated cationic water-soluble polymer.

10. A process as claimed in claim 9 wherein said anionic organic salt is selected from the group consisting of trichloroacetates, trifluoroacetates, alkyl sulfonates having from 1 to 22 carbon atoms, aryl sulfonates having from 6 to 22 carbon atoms, alkyl sulfates having from 1 to 22 carbon atoms, and aryl sulfates having from 6 to 22 carbon atoms.

11. A process as claimed in claim 9 wherein said precipitated cationic water-soluble polymer contains recurring units having the formula

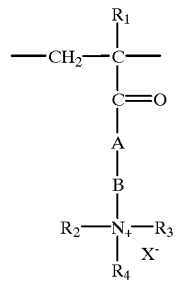

where $R_1$ is either hydrogen or $CH_3$, A is either an oxygen atom or NH, B is an alkylene or oxyalkylene group having 1 to 5 carbons, $R_2$ and $R_3$ are each an alkyl group having from 1 to 3 carbons, $R_4$ is either an alkyl group having from 1 to 10 carbons, or an aryl group having from 6 to 10 carbons, and X is an anionic counterion.

12. A process as claimed in claim 11, wherein said precipitated cationic water-soluble polymer further contains recurring (meth)acrylamide units.

13. A process as claimed in claim 9 wherein some or all of said precipitated cationic water-soluble polymer is precipitated as a polymer dispersion.

14. A process as claimed in claim 9 wherein said aqueous composition is further comprised of a water-soluble polymer different from said precipitated cationic water-soluble polymer.

15. A process as claimed in claim 9 wherein said aqueous composition contains water in an amount of 0.1% to 20%, by weight, based on total weight.

16. A process comprising polymerizing monomers comprised of a quaternary salt of a dialkylaminoalkyl(alk)acrylate, in an aqueous solution comprised of (a) from 0.5% to 40%, by weight based on total weight, of a sulfonate salt and (b) from 1% to 28%, by weight based on total weight, of a sulfate salt, to form an aqueous composition comprising at least one precipitated cationic water-soluble polymer.

17. A composition comprised of water, at least one precipitated cationic water-soluble polymer, at least one kosmotropic salt, and at least one anionic organic salt, wherein said kosmotropic salt and said anionic organic salt are present in amounts effective to precipitate said cationic water-soluble polymer.

18. A composition as claimed in claim 17, wherein said anionic organic salt is selected from the group consisting of trichloroacetates, trifluoroacetates, alkyl sulfonates having from 1 to 22 carbon atoms, aryl sulfonates having from 6 to 22 carbon atoms, alkyl sulfates having from 1 to 22 carbon atoms, and aryl sulfates having from 6 to 22 carbon atoms.

19. A composition as claimed in claim 17, wherein said precipitated cationic water-soluble polymer contains recurring units having the formula

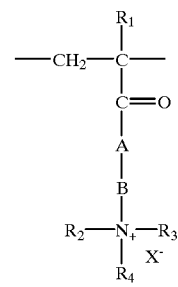

where $R_1$ is either hydrogen or $CH_3$, A is either an oxygen atom or NH, B is an alkylene or oxyalkylene group having 1 to 5 carbons, $R_2$ and $R_3$ are each an alkyl group having from 1 to 3 carbons, $R_4$ is either an alkyl group having from 1 to 10 carbons, or an aryl group having from 6 to 10 carbons, and X is an anionic counterion.

20. A composition as claimed in claim 19, wherein said precipitated cationic water-soluble polymer further contains recurring (meth)acrylamide units.

21. A composition as claimed in claim 17, wherein some or all of said precipitated cationic water-soluble polymer is precipitated as a polymer dispersion.

22. A composition as claimed in claim 17, which is further comprised of a water-soluble polymer different from said precipitated cationic water-soluble polymer.

23. A composition as claimed in claim 17, wherein said water is present in an amount of 0.1% to 20%, by weight, based on total weight.

24. A composition comprised of water, at least one precipitated cationic water-soluble polymer, from 1% to 27% by weight, based on total weight, of a sulfate salt, and from 0.5% to 35% by weight, based on total weight, of a sulfonate salt, wherein said precipitated cationic water-soluble polymer is comprised of recurring units of a quaternary salt of a dialkylaminoalkyl(alk)acrylate.

* * * * *